March 7, 1967

R. M. TINK ETAL 3,308,439

ON-LINE SYSTEM

Filed Jan. 2, 1964

Inventors.
Robert M. Tink
Robert A. Melnick
Frank B. Andrews, Jr.

By: Louis A. Kline
John J. Mathago
Nathan Cass
Their Attorneys.

March 7, 1967 R. M. TINK ETAL 3,308,439
ON-LINE SYSTEM
Filed Jan. 2, 1964 10 Sheets-Sheet 3

Inventors.
Robert M. Tink
Robert A. Melnick
Frank B. Andrews, Jr.

By: Louis A. Kline
John J. Matlago
Nathan Cass
Their Attorneys.

March 7, 1967 R. M. TINK ETAL 3,308,439
ON-LINE SYSTEM
Filed Jan. 2, 1964 10 Sheets-Sheet 4

FIG.7
Input message segment

| Digit Position | Information |
| --- | --- |
| 1 | Window Machine Scan position |
| 2 | |
| 3 | Amount row 9 |
| 4 | Amount row 8 |
| 5 | Amount row 7 |
| 6 | Amount row 6 |
| 7 | Amount row 5 |
| 8 | Amount row 4 |
| 9 | Amount row 3 |
| 10 | Amount row 2 |
| 11 | Amount row 1 |
| 12 | Window machine # Units |
| 13 | Window machine # Tens |
| 14 | Control row 4 |
| 15 | Control row 1 |
| 16 | Control row 2 |
| 17 | Control row 3 |
| 18 | Longitudinal Check digit |

FIG.8
Output message segment

| Digit Position | Information |
| --- | --- |
| 1 | Window Machine Scan position |
| 2 | |
| 3 | Amount row 9 |
| 4 | Amount row 8 |
| 5 | Amount row 7 |
| 6 | Amount row 6 |
| 7 | Amount row 5 |
| 8 | Amount row 4 |
| 9 | Amount row 3 |
| 10 | Amount row 2 |
| 11 | Amount row 1 |
| 12 | Lights |
| 13 | Auto cycle digit |
| 14 | Control row 4 |
| 15 | Control row 1 |
| 16 | Control row 2 |
| 17 | Control row 3 |
| 18 | Longitudinal Check digit |

FIG.6

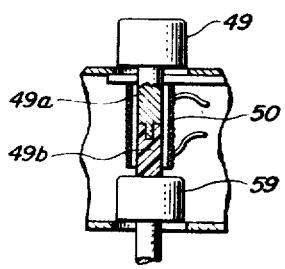

Inventors.
Robert M. Tink
Robert A. Melnick
Frank B. Andrews, Jr.

By: Louis A. Kline
John J. Maclago
Nathan Cass
Their Attorneys.

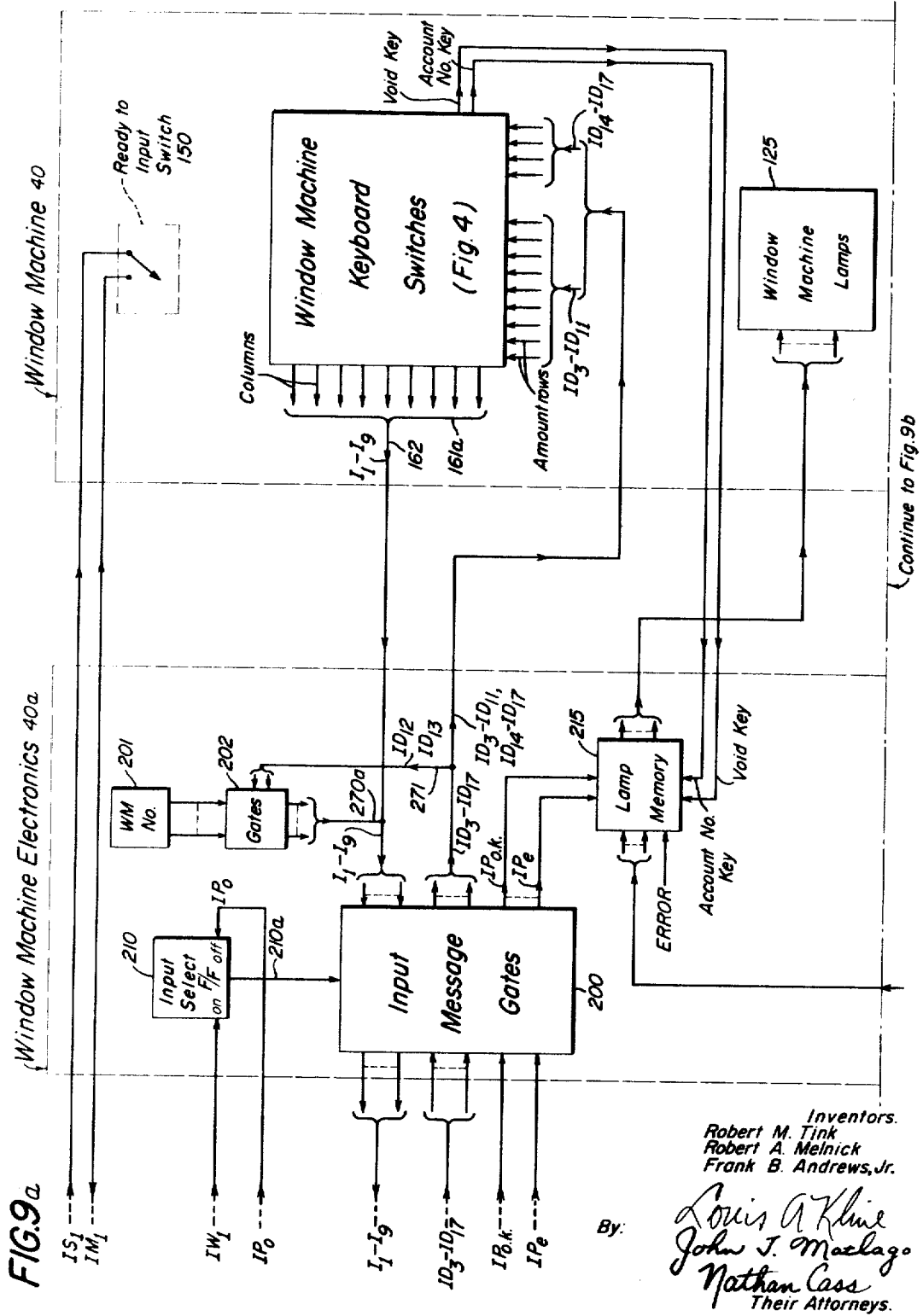

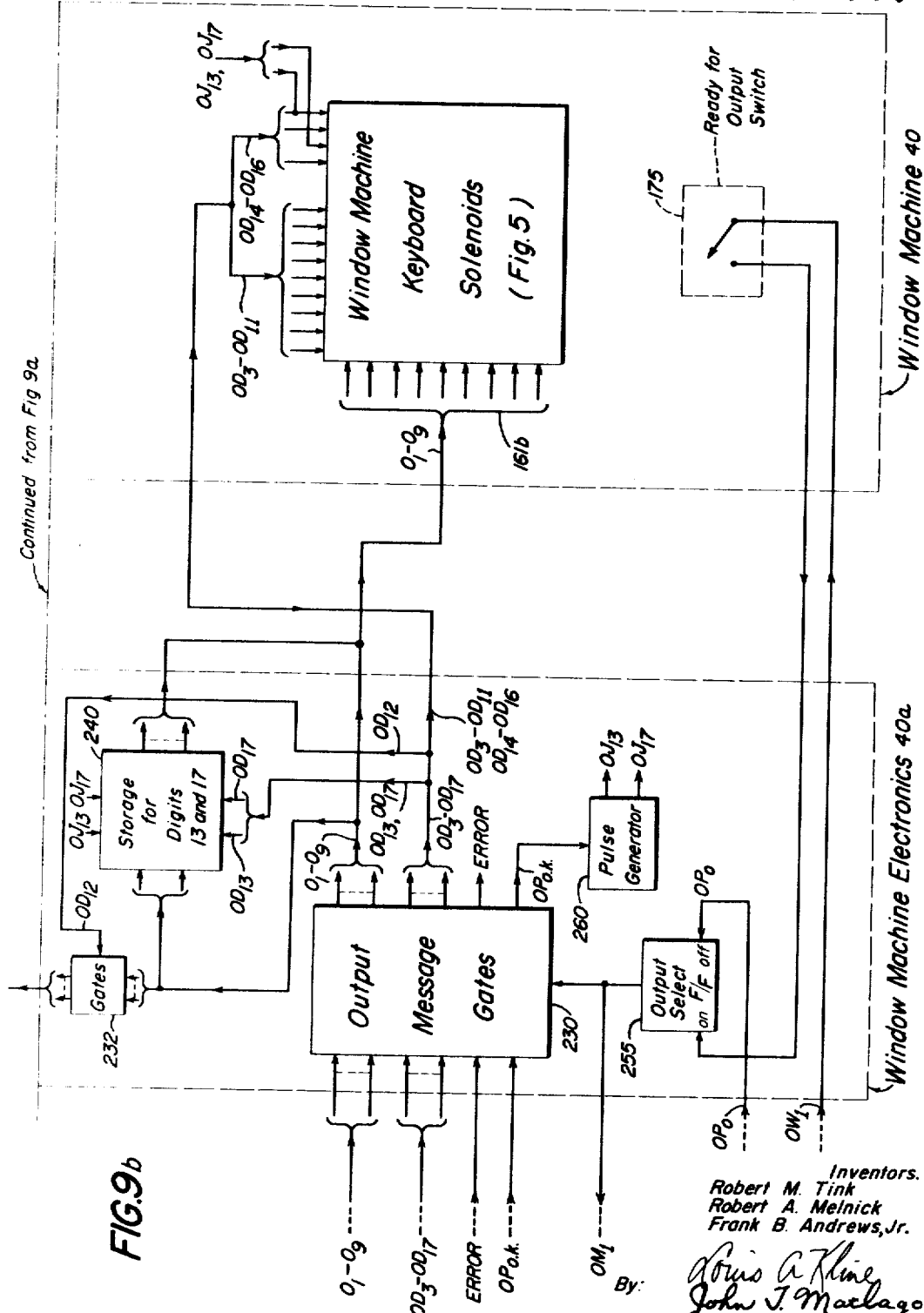

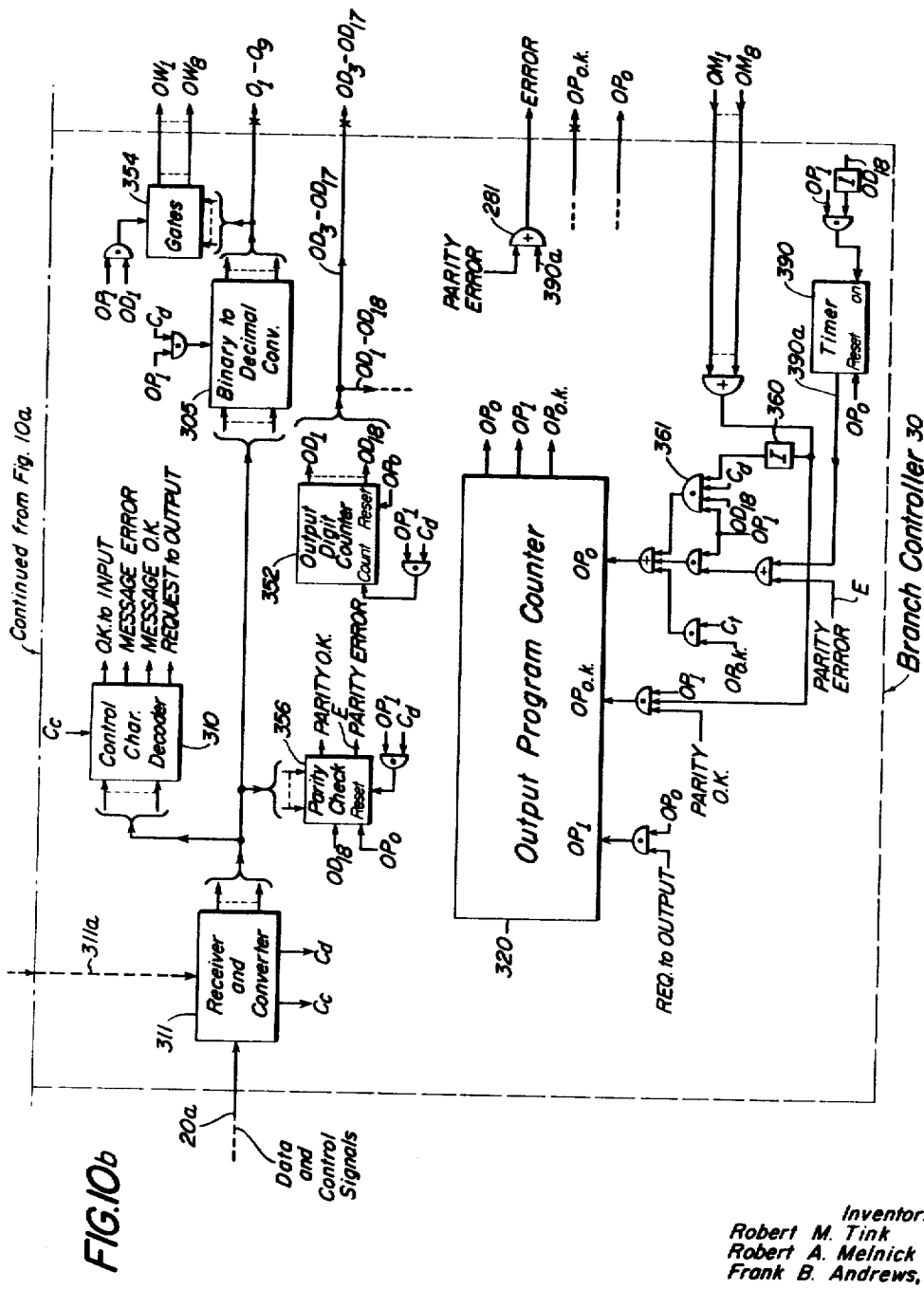

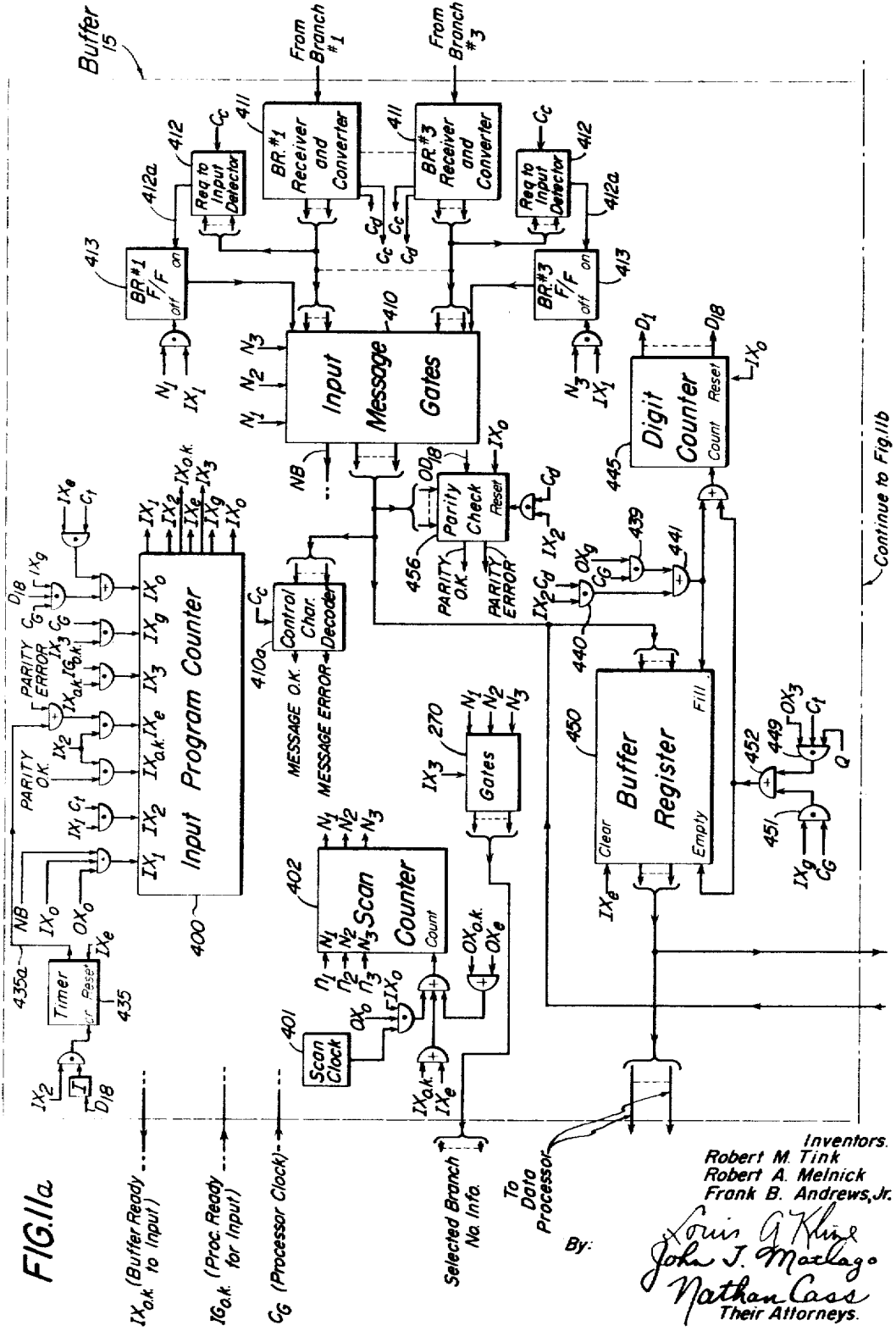

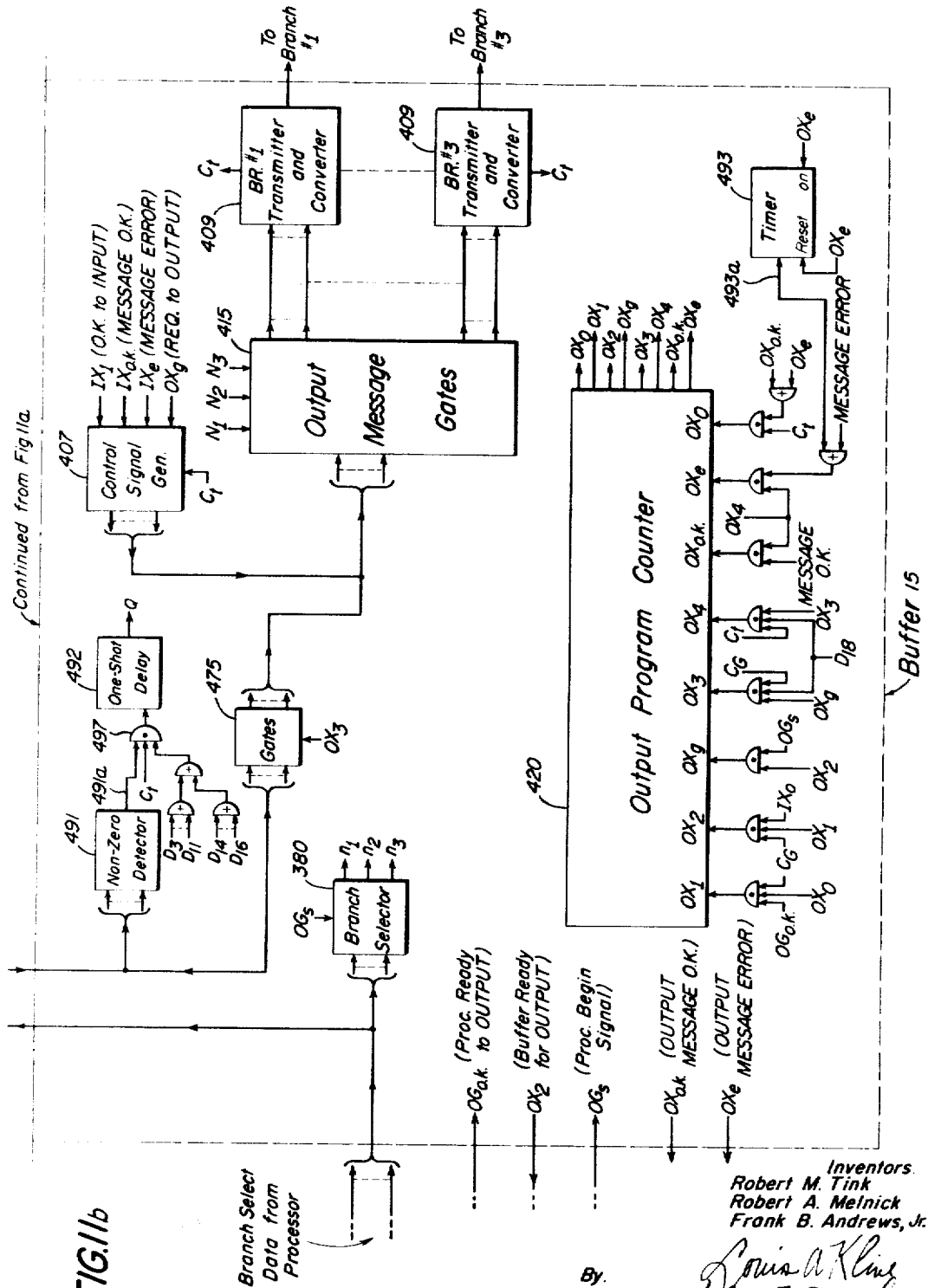

3,308,439
ON-LINE SYSTEM
Robert M. Tink, Redondo Beach, Robert A. Melnick, Los Angeles, and Frank B. Andrews, Jr., Gardena, Calif., assignors to The National Cash Register Company, Dayton, Ohio, a corporation of Maryland
Filed Jan. 2, 1964, Ser. No. 335,184
13 Claims. (Cl. 340—172.5)

This invention relates generally to data processing systems and more particularly to data processing devices intended for use in the banking field.

In the past decade there has been an upsurge in the use of banking services with more depositors, more borrowers and more special services being provided by banks each year. In many cases, the paperwork related to these services has increased disproportionally, with the result that banks have been forced to hire additional people and obtain additional floor-space in an attempt to maintain adequate customer services. To eliminate some of these problems, more and more banks have been looking towards the fast growing electronic data processing field to provide a solution to these problems.

Early application of data processing to the banking field involved the use of teller window machines which, in addition to the normal activities of updating a customer's passbook and providing a journal tape for auditing purposes, also simultaneously punched a paper tape which could be removed from the window machine and fed to a data processor for accounting purposes. While this early approach was a help in alleviating the paper work and employee time involved in keeping banking records current, many of the bank's problems remained unsolved. For example, the teller still had to manually post the interest to the customer's passbook from an interest card provided by the back office at the end of each period. Also, the teller still had no convenient access to the bank's record of accounts for reference purposes and it was necessary to provide account files on the floor which he could refer to when necessary.

To provide a more complete solution to such banking problems, more and more banks have been turning to what is commonly referred to in the computer art as an on-line system. From the banking point of view, an on-line system is one in which a teller, using an appropriate window machine, is able to send and receive information from a remotely located data processor while the customer is actually at the teller's window. In such a system the customer's transaction (such as a deposit or a withdrawal) is fed via the window machine to the data processor which has full information of the customer's account. Thus, the data processor can provide any appropriate information to the teller as well as causing proper updating of the customer's passbook, all without the teller having to leave the window.

It will be appreciated that there are many possible approaches to the design of an on-line banking system. Obviously, if unlimited funds are available a highly sophisticated and very rapid system can be devised in accordance with presently known techniques so as to provide an on-line banking system having all the capabilities and speed that a bank might desire. However, as always, cost is a vital consideration so that a practical system must necessarily be a compromise between cost and function.

In accordance with the present invention an on-line system is provided which meets the important objectives of an on-line banking system at reasonable cost and with a minimum of required equipment and, in addition, provides a number of unique and highly advantageous features.

Accordingly, it is a broad object of the present invention to provide an on-line banking system which achieves the important objectives of such a system at reasonable cost and with a minimum of equipment.

Another object of the invention is to provide an on-line banking system which requires a minimum of storage at each branch of a multi-branch bank system.

A further object of this invention is to provide, in accordance with any or all of the foregoing objects, an on-line banking system in which off-line operations can conveniently be handled in the event the data processor or the communication equipment associated therewith is not operating, and in which such off-line operations can conveniently be entered into the data processor at a later time for handling with previous or future on-line data.

Still another object of the present invention is to provide, in accordance with any or all of the foregoing objects, an on-line banking system which permits a reduction in the customer waiting time at the teller's window.

Still another object of the present invention is to provide a system, in accordance with any or all of the foregoing objects, which prevents undetected errors from occurring either at the teller window machine or at the data processor.

Yet another object of the present invention is to provide an on-line banking system, in accordance with any or all of the foregoing objects, in which the operations required of the teller are essentially the same during both on-line and off-line operations.

A still further object of the present invention is to provide an on-line banking ssytem, in accordance with any or all of the foregoing objects, in which errors will not be printed out on the customer's passbook.

Yet a further object of the present invention is to provide an on-line banking system, in accordance with any or all of the foregoing objects, in which previous unposted information (such as interest and no book transactions) can be posted on the first presentation of the customer's passbook.

Still another object of the invention is to provide an on-line banking system, in accordance with any or all of the foregoing objects, in which current balances and account conditions are made available to any teller's window.

An additional object of the invention is to provide an on-line banking system, in accordance with any or all of the foregoing objects, in which the required changes in the operation and construction of conventionally available window machines for use with the system are reduced to a minimum.

Another object of the invention is to provide an on-line banking system, in accordance with any or all of the foregoing objects, in which messages from either the window machine or the data processor are divided into convenient message segments, these message segments being appropriately time-multiplexed by the system so as to increase the speed capabilities thereof with a minimum of required information storage.

A still further object of the invention is to provide an on-line banking system, in accordance with any or all of the foregoing objects, in which a variable transmission rate capability is provided for information fed from the data processor to the bank branches so as to permit slower operating mechanisms (such as are present in the window machine) to be satisfactorily operated, while permitting faster operating devices to receive information at a faster rate, thereby providing a higher average operating speed for the system.

Yet a further object of the present invention is to provide an on-line banking system, in accordance with any or all of the foregoing objects, in which a minimum of telephone lines are required between each bank branch and the bank's central accounting location.

The specific nature of the invention as well as other objects, advantages and uses thereof will become apparent from the following description taken in conjunction with the accompanying drawings in which:

FIG. 6 is a fragmentary cross-sectional view illustrating how the window machine of FIG. 3 may be provided with a double keyboard to permit operation of the window machine in a similar manner whether by an operator or by electrical signals derived from a data processor;

Figure 10A:
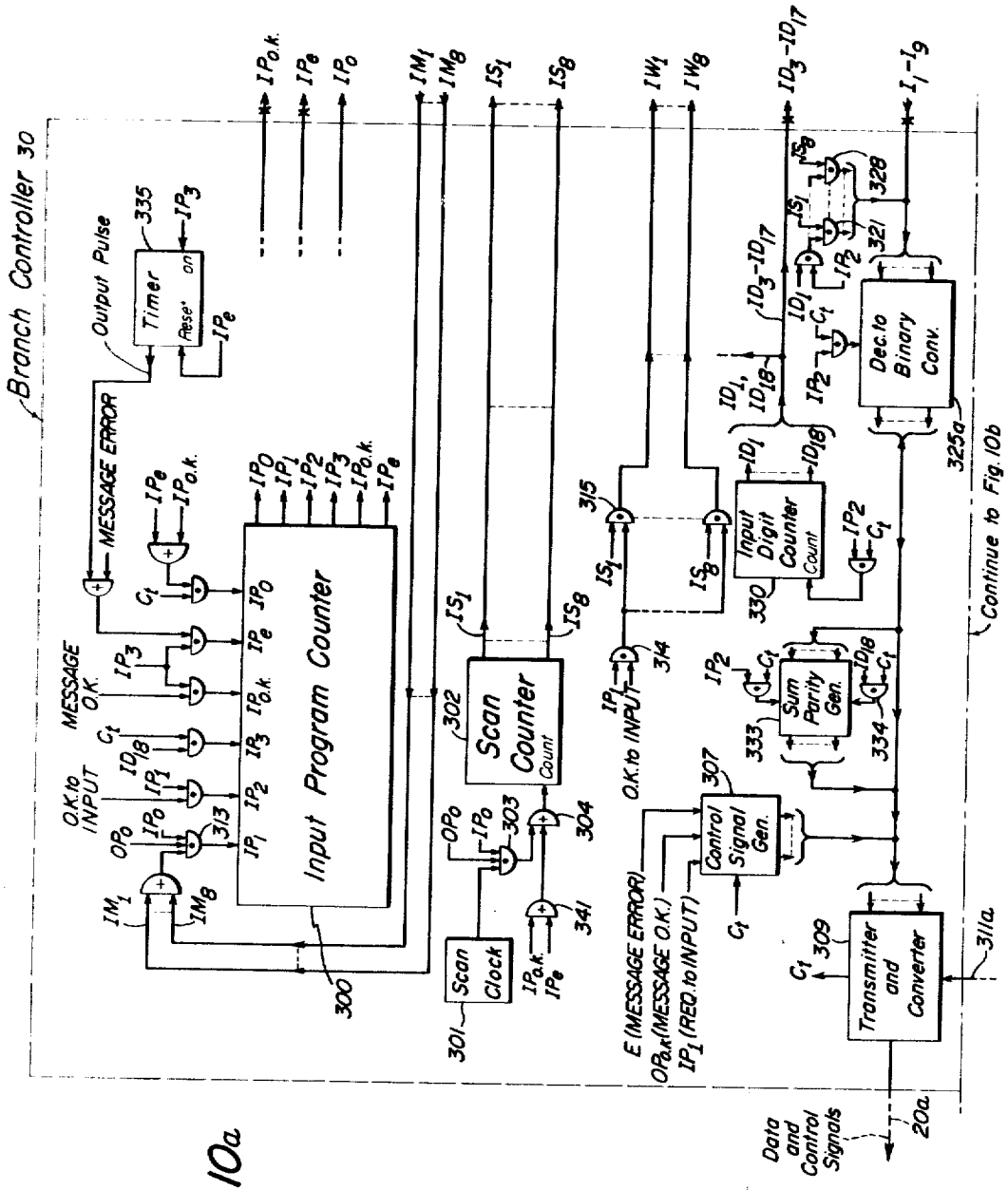

FIGS. 7 and 8 respectively illustrate a typical format for input and output message segments transmitted between the central accounting location and each branch;

FIG. 9 (which is constituted by FIGS. 9a and 9b) is a schematic electrical block and circuit diagram illustrating a typical logical mechanization of a window machine and its associated electronics unit;

FIG. 10 (which is constituted by FIGS. 10a and 10b) is a schematic electrical block and circuit diagram illustrating a typical logical mechanization of a branch controller; and FIG. 11 (which is constituted by FIGS. 11a and 11b) is a schematic electrical block and circuit diagram illustrating a typical logical mechanization of a buffer at the central accounting location.

INTRODUCTION

Figure 1:
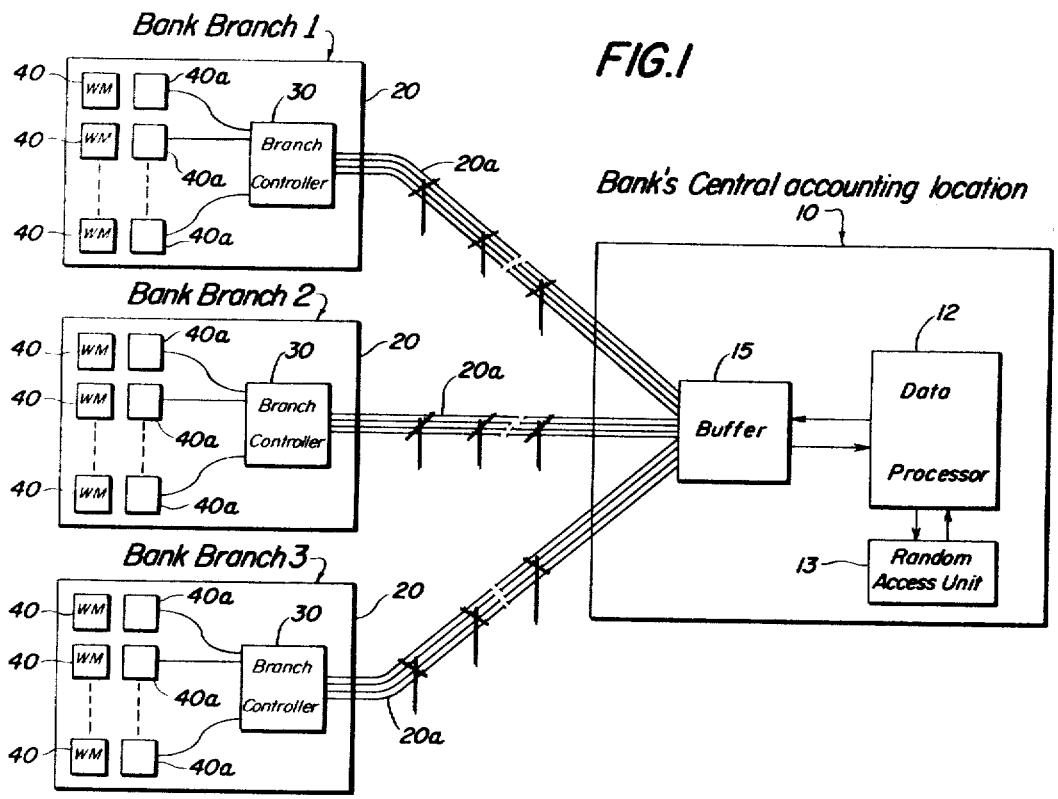
FIG. 1 is a schematic overall view of a typical on-line banking system in accordance with the present invention.

An overall schematic view of a typical on-line banking system in accordance with the present invention is illustrated in FIG. 1. It will be seen that the system broadly comprises a central accounting location 10 communicating with a plurality of bank branches 20 by means of telephone lines 20a. At the central accounting location 10, a data processor 12 is provided cooperating with a random access unit 13 which provides rapidly accessible high capacity storage for information concerning customer accounts. A buffer 15 is provided between the data processor 12 and the telephone lines 20a to control the flow of information between the bank branches 20 and the data processor 12. While only three branches and one buffer 15 are shown in FIG. 1, it will be appreciated that additional branches and buffers could also be employed.

Figure 2:
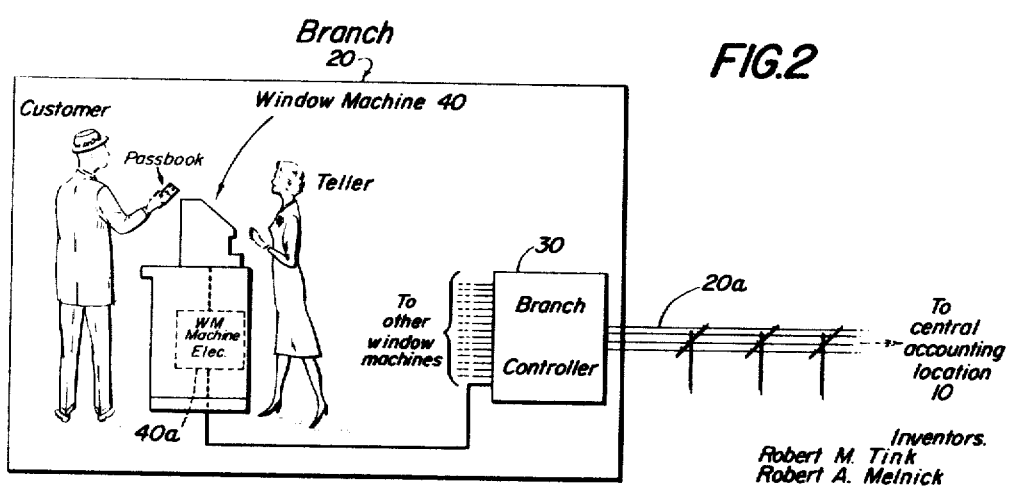
FIG. 2 illustrates a typical set up at a branch.

Still referring to FIG. 1, it will be seen that at each of the bank branches 20, a plurality of window machines 40 serve as the input-output point of origin device for each teller. Each window machine 40 is connected to a respective electronics unit 40a by means of which it is able to communicate with a branch controller 30. The branch controller 30 is in turn connected to its respective branch telephone lines 20a and serves to control communication between the window machines 40 at the branches 20 and the buffer 15 at the central accounting location 10. FIG. 2 illustrates how the equipment at a branch may typically be set up.

In the exemplary embodiment of the invention to be considered herein, there is essentially no message storage at the branch other than that provided by the window machines themselves, and each branch controller 30 permits only one window machine at a time to communicate with the buffer 15 at the central accounting 10. The operation of the buffer 15 is such that, at any one time, the buffer can communicate with either a selected window machine of a selected branch, or with the data processor 12, but not both at the same time. Such restrictions are of considerable help in reducing the system equipment and cost requirements. As will hereinafter become evident, the present invention makes it possible to provide an efficient and sufficiently fast system despite these restrictions.

While various types and forms of equipment can be employed in the on-line banking system of the present invention, some exemplary equipment may be mentioned which are well suited for use in various parts of the system. For example, the data processor 12 at the central accounting location 10 in FIG. 1 may be of the type disclosed in the commonly assigned copending patent application Serial No. 107,109, filed May 2, 1961, while the random access storage unit 13 in FIG. 1 may be of the type disclosed in the commonly assigned copending applications Serial No. 12,032 and Serial No. 162,626 respectively filed on March 1, 1960 and December 8, 1961.

THE WINDOW MACHINE

The window machine 40 indicated in FIGS. 1 and 2 is preferably of the type illustrated and described in U.S. Patent No. 2,774,298, issued to Everett H. Placke et al. on December 18, 1956, which has long been used by a number of savings banks to record the deposits and withdrawals of their customers. Since this window machine is fully disclosed in the aforementioned patent, it will only be considered very generally herein, it being understood that the window machine of the present invention may be similarly provided, except for various modifications desirable for incorporation of the machine into an on-line system. A typical manner in which these modifications may be provided is illustrated and disclosed in the copending commonly assigned U.S. patent application Serial No. 308,382, filed September 12, 1963.

Figure 3:
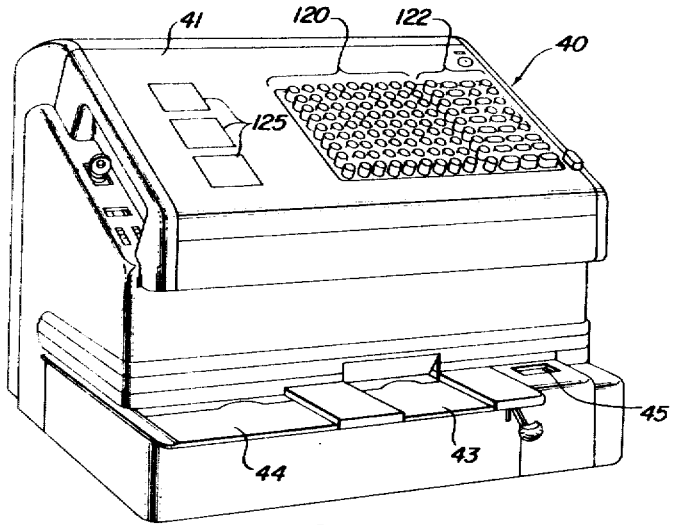
FIG. 3 is a pictorial view of a typical window machine.
Figure 3A:
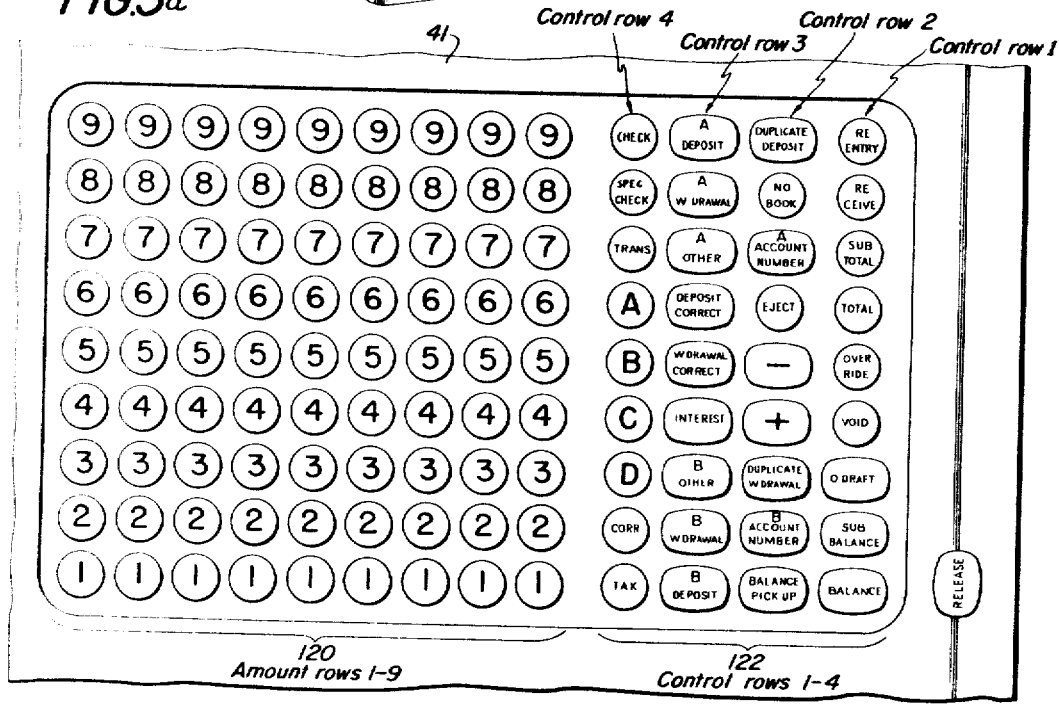
FIG. 3a is a view of the keyboard of the window machine of FIG. 3.

FIGS. 3 and 3a illustrate a window machine 40 of the type disclosed in the just mentioned copending application Serial No. 308,382. A sloping keyboard 41 contains the nine rows of amount keys 120, the four rows of control keys 122, and three groups of indicator lamps indicated at 125. Beneath the keyboard 41 at the front of the machine is a printing table 43 to accommodate the customer's passbook. To the left of the printing table 43 is another printing table 44 to accommodate the transaction slip which is filled out by the customer prior to stepping up to the teller's window. To the right of the printing table 43 in the window machine is another printing mechanism for printing on an audit strip which is visible through a window 45. This audit strip is retained in the machine and all entries in the window machine are printed thereon for auditing purposes, while only selected entries are printed on the customer's passbook and the transaction slip. As in the aforementioned Placke et al. patent, the window machine also includes an add-subtract totalizer which allows the printing of proper balances, whether they be positive or negative, or whether a deposit or a withdrawal is being entered.

Figure 4:
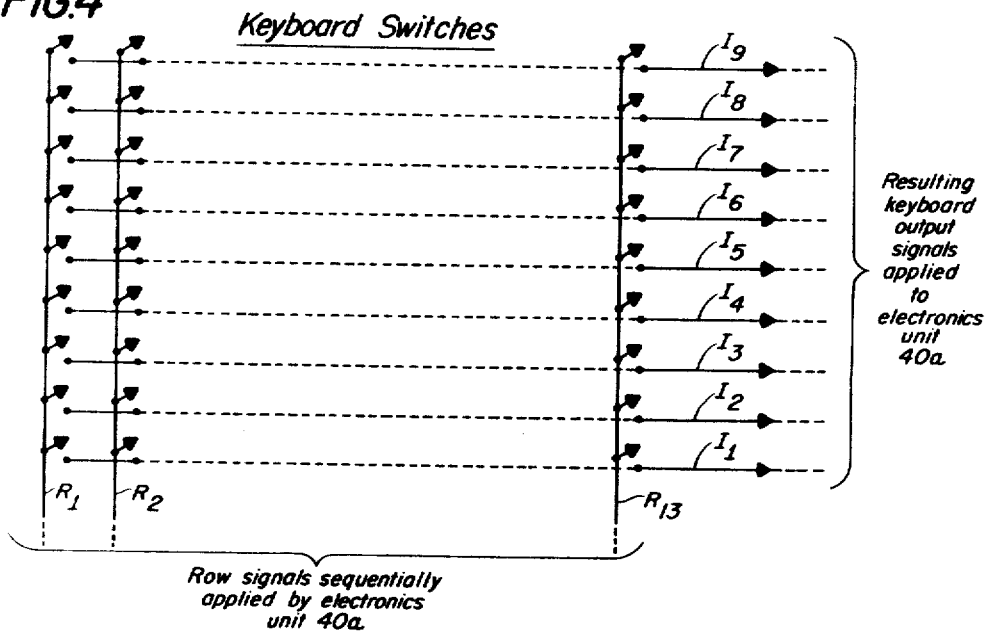
FIG. 4 is a schematic electrical diagram illustrating the keyboard switches incorporated in the window machine of FIG. 3 for use in reading out a keyboard entry.

More recent window machines of the general type disclosed in the aforementioned patent have provision to permit information entered into the keyboard to be electronically scanned to cause a paper tape to be punched in response thereto. This is a well known feature of many types of accounting machines and may advantageously be employed in the present invention to permit read out of information entered into the window machine. A typical manner in which this is accomplished is schematically illustrated in FIG. 4 in which each keyboard switch illustrated therein corresponds to a respective key in the keyboard 41 of FIGS. 3 and 3a; only the first two rows and the last row of keyboard switches are shown in FIG. 4 for the sake of simplicity. It will now be understood that the window machine may typically operate so that information entered into the keyboard by the teller will be transferred to the respective keyboard switches in FIG. 4 when the window machine cycles, a keyboard switch then being closed only if its respective key was depressed by the operator. It will also be understood that if each of the keyboard rows $R_1, R_2 \ldots R_{13}$ is then sequentially energized by signals from the respective electronics unit 40a, the particular one of the columns $I_1$ to $I_9$ in FIG. 4 which receives a signal will correspond to the particular key which was depressed in each row. If none of the columns $I_1$ to $I_9$ receives a signal, then it indicates that no key in the row was depressed, which for the amount rows signifies a zero. By such an arrangement, therefore, the keyboard of a window machine may be interrogated to permit information to be read out therefrom for transmission to the branch controller 30 and then on to the buffer 15 and the data processor 12 at the central accounting location 10.

In addition to being able to send out data entered into its keyboard, the window machine in the on-line system of the present invention is also able to receive messages from the data processor and to be operated thereby in the same manner as if the information were being entered manually by a teller. As disclosed for example in the aforementioned copending application Serial No. 308,382, and as similarly illustrated in FIG. 5, this may be accomplished by the use of an auxiliary solenoid-operated keyboard which is superimposed over a conventional keyboard, such as the keyboard illustrated in the aforementioned Placke et al. patent. Only one key 49a from the auxiliary upper keyboard and its respective cooperating key 49b in the lower keyboard is shown in FIG. 6, but it will be understood that the other keys may be similarly arranged.

As illustrated in FIG. 6, the upper key 49 is provided with a shaft having an upper portion 49a of magnetizable material and a lower portion 49b of an unmagnetizable material, the two portions 49a and 49b being rigidly coupled together. The lower end of the unmagnetizable portion 49b is located adjacent and in contact with the head of the lower key 59. It will be understood, therefore, that when the teller presses the upper key 49, it will cooperate with the lower key 59 to cause operation thereof just as if the teller were depressing the lower key 59 directly.

The arrangement shown in FIG. 6 will thus not affect the teller's normal operation of the keyboard, but it will permit the data processor to operate the keyboard in the same manner as the teller. This is accomplished by providing a solenoid 50 encircling the shaft 49a, 49b of the upper key 49 and having an appropriate energizing winding. When this solenoid winding is suitably energized by an electrical signal, the upper magnetized portion 49a of the shaft of the upper key 49 (in accordance with conventional solenoid action) will be driven downward into the solenoid to cause operation of the lower key 59 just as if the upper key 49 were depressed by the teller.

Figure 5:
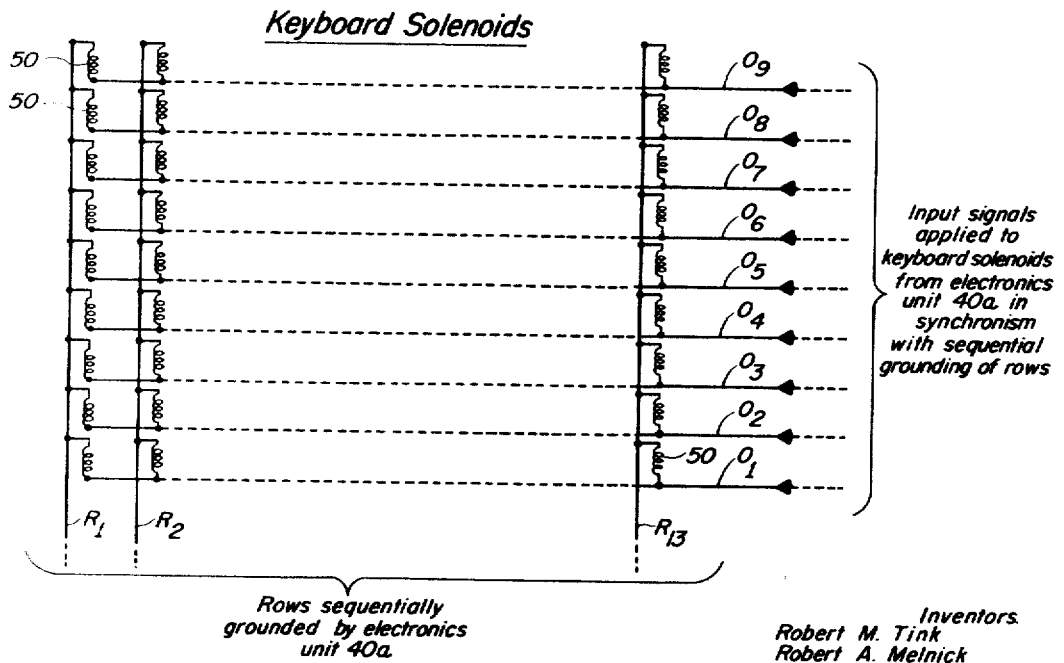
FIG. 5 is a schematic electrical diagram illustrating the keyboard solenoids incorporated in the window machine of FIG. 3 for use in setting the keyboard in accordance with electrical signals derived from a data processor.

FIG. 5 illustrates how the solenoid 50 of each key may typically be interconnected with the solenoids of other keys in order to permit the data processor to cause the appropriate key in each row to be depressed. The keyboard solenoids 50 are arranged in an array similar to the arrangement of the keyboard switches in FIG. 4. When information is to be entered into the window machine keyboard from the data processor, the rows $R_1, R_2 \ldots R_{13}$ are sequentially grounded in synchronism with the application of signals $O_1$ to $O_9$ to selected columns of the array in accordance with the information to be entered. In other words, as each row is grounded, a selected one of the signals $O_1$ to $O_9$ is applied to a respective column of the array to cause the solenoid located at the thus selected row and column to be the only one through which a complete circuit is provided. Consequently as each row is grounded, only a selected solenoid in the row will be energized to cause activation of its corresponding key in the keyboard. If no key is to be activated in a row, no signal is applied to any of the columns when that row is grounded.

With regard to the lights 125 provided on top of the window machine keyboard 41 in FIG. 3, at this time it is sufficient merely to note that certain ones thereof are connected to the respective electronics unit 40a to apprise the teller of various conditions during the handling of a customer transaction, such as the existence of an error.

As to information concerning the operations performed by specific keys of the window machine and/or other features not mentioned herein, or only generally mentioned, reference may be made to the aforementioned Placke et al. patent and the copending application Serial No. 308,382.

SYSTEM OPERATION

At this point, it will be helpful to generally examine the operation of the on-line system of the present invention. This description will be provided in two ways. First, for the sake of simplicity, a description will be given considering just the overall cooperation between a window machine 40 and the data processor 12 (including its random access unit 13) during a typical transaction, without considering the operation of the intermediate equipment—that is, the respective electronics unit 40a, the branch controller 30, and the buffer 15 shown in FIG. 1. This description will then be followed by a description which will primarily consider the function and operation of the intermediate equipment. Finally, to complete the specification, the two descriptions above will be followed by a typical example illustrating how the on-line system of the present invention can be mechanized.

Overall cooperation between a window machine and the data processor

A simple deposit or withdrawal transaction will illustrate a typical on-line operation. When a customer wishes to deposit or withdraw from his savings account, he fills out a transaction slip on which he indicates the nature and amount of the transaction. The customer then walks up to any teller's window and presents this transaction slip and his passbook to the teller. The teller verifies the amount of the transaction and inserts the passbook into the center printing table 43 and the transaction slip into the left printing table 44 (FIG. 3). The teller then enters the amount of the customer's old balance into the amount keys 120 (FIGS. 3 and 3a) and depresses the BALANCE PICKUP key (FIG. 3a) in row 2 of the control keys 122 to identify that it is the customer's old balance which has been entered. Depression of this BALANCE PICKUP key causes the window machine to be cycled so that the data in the keyboard is transferred to the keyboard switches (FIG. 4).

Depression of the BALANCE PICKUP key also causes the old balance to be recorded in the window machine add-subtract totalizer, and printing occurs only on the audit strip and not on the transaction slip or the customer's passbook. The thus entered old balance constitutes the first entry of three entries which will be made by the teller in handling the typical customer transaction being considered here.

A short time after the teller enters this first entry constituting the customer's old balance (which is normally no longer than a few seconds), the data thus entered into the keyboard will automatically be read out (as previously described in connection with FIG. 4) and sent to the data processor along with appropriate auxiliary information (such as the window machine number, the scan position at its respective branch, and error check signals). This first entry and its auxiliary information sent to the data processor constitutes the first of three input message segments (one for each entry by the teller) which will be sent to the data processor in handling this typical customer transaction. Message segments sent from the window machine to the data processor will be designated as "input" message segments, and message segments sent from the processor to the window machine will be designated as "output" message segments.

After the window machine keyboard switches have been read out, an appropriate one of the lamps 125 (FIG. 3) on the keyboard will be illuminated to indicate that the teller may make the second entry into the window machine. This second entry is the transaction—that is, the amount to be deposited or withdrawn from the customer's account. The teller enters the transaction by entering the amount of the deposit or withdrawal in the amount keyboard 120 (FIG. 3), and then depresses an appropriate one of the control keys 122 such as, for example, the A DEPOSIT key (FIG. 3a) if the transaction is a deposit, or the A W DRAWAL key if the transaction is a withdrawal. The "A" on these deposit and withdrawal keys merely identifies a particular teller, there also being a B DEPOSIT key and a B W DRAWAL key for use by another teller. Depression of these deposit or withdrawal keys cycles the window machine, but the transaction is not stored since the window machine add-subtract totalizer is not affected, and printing occurs only on the audit strip. Thus, during input, the window machine merely serves as a way of sending the transaction to the processor, but does not store the transaction, except on the audit strip.

As with the first entry, a short time after the teller makes the second entry into the window machine corresponding to the transaction, the window machine keyboard will automatically be read out, and along with appropriate auxiliary information will be sent to the data processor as the second input message segment. At the processor, this second input message segment containing the transaction is stored with the first input message segment until the third and last input message segment is received by the processor.

After the second entry is read out, the window machine indicates by a lamp on the keyboard that the teller may make the third and final entry which is the customer's account number. The teller makes this final entry by entering the account number into the amount keys 120 (FIG. 3) and depressing his appropriate number control key to cycle the machine, such as the A ACCOUNT NUMBER key. As with the depression of a deposit or withdrawal key, depression of an account key cycles the window machine, but does not affect the window machine add-subtract totalizer and prints only on the audit strip. The depression of an account key is also used to signify the end of an input message. In addition, depression of an account key causes the keyboard to be locked out from further manual entry by the teller (except for certain special keys such as the VOID key) until the data processor completes its output message.

Again, shortly after the teller makes this third and final entry constituting the customer's account number, the window machine keyboard switches (FIG. 4) will automatically be read out, and along with appropriate auxiliary information will be sent to the data processor as the third and final input message segment. Since this is the final input message segment, an appropriate lamp on the keyboard is illuminated to apprise the teller that the input message is completed and the window machine is awaiting an output message from the data processor.

The data processor receives an input message segment for each entry made by the teller. When the data processor receives the final input message segment from the window machine containing the customer's account number and a signal representative of the depression of an account key, it recognizes that the input message is completed and begins processing the transaction. First, using the customer's account number contained in the final message segment, the data processor selects the customer's account record from the random access unit 13 (FIG. 1). The processor then compares the passbook old balance contained in the first input message segment with the balance stored in the customer's account record. If they agree, the processor then applies the transaction contained in the second input message segment to update the customer's account record, which is then returned to the random access unit, and an output message consisting of a single output message segment (which is all that is necessary for this typical transaction) is sent to the window machine from which the input message was received.

This single output message segment sent by the processor contains the same transaction which was sent to the data processor by the window machine in the second input message segment, and operates on this same window machine to cause activation of selected ones of its keyboard solenoids (as previously explained in connection with FIGS. 5 and 6) in accordance with the transaction. Thus, just as occurred as a result of the teller marking the second entry, the amount keys 120 (FIGS. 3 and 4) of the window machine are activated in accordance with the amount of the transaction, and an appropriate control key, such as A DEPOSIT or A W DRAWAL is activated to identify the teller and the type of transaction. However, in addition, the output message sent by the data processor also causes depression of the RECEIVE key in order to permit printing of the transaction in the customer's passbook and on the transaction slip. This is the first time that anything is printed in the customer's passbook, although all entries in the keyboard, whether by the teller or the processor, are printed on the audit tape. The advantage of not permitting printing in the customer's passbook until this time is that errors which may occur during handling of the transaction will not be printed in the passbook.

Depression of the RECEIVE key also permits activation of the add-subtract totalizer, so that only at this time will the transaction be added to (or subtracted from) the customer's old balance which was placed in the add-subtract totalizer during the teller's first entry as a result of depression of the BALANCE PICK UP key. The output message from the data processor is terminated by the processor causing depression of the BALANCE key which automatically initiates a second cycle that clears the add-subtract totalizer, prints the new balance in the customer's passbook, the transaction slip and the audit strip, unlocks the keyboard, and illuminates an appropriate lamp on the keyboard to inform the teller that the window machine is ready to handle the next customer's transaction.

At this point in the description, it will be helpful to note why it is advantageous to have the data processor send back the transaction to the window machine, rather than some other information, such as, for example, the new balance. The reason is that it is an important objective to have the window machine operate in the same manner, whether it is being operated by the teller or the data processor. This not only permits the same type of window machine mechanization to be employed as is already available in presently used bank window machines, but also makes conversion to off-line operation a simple matter in the event that the on-line system is inoperative. It will be understood that by having the data processor send back the transaction to the window machine along with causing depression of the RECEIVE and BALANCE keys permits the window machine to operate just as if the teller were making the same entry, in which case, the window machine totals and printing mechanisms are activated to print out and extend the balance essentially as in the presently available window machine disclosed in the aforementioned Placke et al. patent.

It will of course be appreciated that the typical transaction considered above is merely exemplary and that many variations are possible. For example, if the data processor finds that the old balance contained in the first input message segment sent by the window machine does not agree with the balance provided by the random access storage unit, it then checks to see whether there is any unposted interest or no-book transactions which has not been posted to the customer's passbook. If including these amounts produces agreement, the data processor will first send appropriate output message segments (along with signals to cause depression of the RECEIVE key and SUB BALANCE key for each segment) to post the previously unposted transactions. The data processor will then send an output message segment containing the new transaction as well as a signal to depress the BALANCE key to extend the overall balance and indicate the end of the output message from the computer, after which the customer's passbook will be completely updated. It is to be noted that each of the unposted transactions, like the new transaction, is sent to the window to cause operation thereof just as if the teller knew of these unposted transactions and entered them himself.

As a third exemplary variation, it is to be noted that in in the event that the data processor cannot reconcile the old balance sent by the window machine, or cannot find the account number, then the computer may send back an error message segment to the window machine which lights an appropriate lamp on the window machine keyboard to inform the teller of the error condition.

It will further be understood that other types of transactions may be handled besides merely a deposit or withdrawal. For example, the teller may merely wish to inquire about the status of a customer's account. In such a case he would make only a single entry which would be the customer's account number followed by depression of an account number key (such as A ACCOUNT NUMBER). The processor would then be initiated by a signal derived from the depression of the account number key (as with any other type of transaction) but because only the account number was sent, the processor would recognize that just the status of the customer's account was being requested, and would send an appropriate output message accordingly.

As a further example, the transaction may merely involve the updating of a customer's passbook without a deposit or a withdrawal. In such a case, the teller makes two entries, the first one being the customer's old balance and the second being the customer's account number. Again the processor is initiated by a signal derived from depression of an account number key, and this time would recognize, from the absence of an input message segment corresponding to a specific transaction, that only updating is requested and would accordingly send only the requested updating information (such as unposted interest or previous no-book transactions).

*Description of the operation of the intermediate equipment between the window machine and the data processor*

The primary purpose of the previous overall description has been to provide a general idea of system operation from the viewpoint of the window machine and the data processor. The present description will now consider the part played by the intermediate equipment shown in FIGS. 1 and 2, namely the respective electronics unit 40a associated with each window machine, the branch controller 30, and the buffer 15 at the central accounting location 10.

Initially, it will be helpful to note that in the exemplary on-line system being considered herein, operation is such that only one message segment (whether an input message segment or an output message segment) can be sent or received at a time, and scanning is employed to permit appropriate sharing of the sending and receiving facilities so as to permit the system to handle customer transactions at high speed, despite the fact that only one message segment is communicated at a time. This intermixing of message segments (rather than of whole messages, for example) permits the most advantageous use of the available time.

This division into message segments is advantageous because a message segment includes the full capacity of a single entry transferred into the window machine's keyboard switches (FIG. 4) and can be read out therefrom without waiting for any further activity of the teller. If a window machine does not contain an input message segment or is busy, the scanning system permits operation to proceed to a different window machine so that a window machine which is ready to send an input message segment to the data processor will not be held up by the actions of the tellers of other window machines. Output message segments are not under the control of the teller so they are likewise not unduly slowed up by teller activity. Furthermore, it will be appreciated that the division of a message into separately communicated message segments is not burdensome on the teller since, after entering a message segment, it takes a significant time (as compared to the time of equipment operation) for the teller to enter the next message segment and by that time the system is usually able to accept the next input message segment.

It is also to be noted that another advantageous feature of the invention resides in the manner in which the end of a complete message is signified. It will be remembered that for an input message the end of the message is signified by depression of an account number key on the last entry by the teller, and the signal derived therefrom in the last input message segment permits the processor to recognize the end of the message. Thus, no matter how many segments an input message requires, the processor will always be able to recognize when the input message is completed in this convenient manner. This same advantage is realized for the output message by the depression of the balance key during the automatic second cycle of the last output message segment. As will become apparent, the use of such an approach for signifying the end of both an input message and an output message makes it possible for the intermediate equipment to operate in substantially the same manner on all input message segments, and in substantially the same manner on all output message segments, regardless of the particular type of data contained therein, thereby permitting a simpler and more economical system.

Now considering the operation of the intermediate equipment provided between the window machine and the data processor, it is to be understood that, while many steps are involved, they occur very rapidly at electronic or electromagnetic speeds.

For ease of understanding, the description will be provided in two parts, the first part being concerned with the operation occurring when the window machine sends data to the data processor (input information flow), and the second part being concerned with the operation occurring when the data processor sends data to the window machine (output information flow). Also, each part will be broken down into numbered steps.

*Input information flow—(From window machine to processor)*

(1) When the branch controller 30 at each branch is able to accept an input message from a window machine 40, it serially scans the branch window machines 40 via their respective electronics unit 40a looking for a window machine which is ready to send an input message segment.

(2) When the scanning of the controller 30 causes it to arrive at a window machine which is ready to input an input message segment from its keyboard switches (FIG. 4), the controller 30 stops scanning and locks onto that window machine 40 via its respective electronics unit 40a. For the purpose of this description, the selected window machine will be referred to as window machine #1, and its branch as branch #1, and it will be assumed that the same three entries are to be entered into the window machine and the same three input message segments are to be sent to the central location 10 as assumed in the previous description.

(3) After the teller's first entry (which is the customer's old balance) has been transferred to the keyboard switches as a result of the teller depressing the BALANCE PICKUP key, and the branch controller 30 subsequently locks thereon, the controller 30 sends a REQUEST TO INPUT control signal to the buffer 15 at the central installation 10, via its respective telephone lines 20a, to advise the buffer that branch #1 is ready to send an input message segment.

(4) Like the branch controller 30, when the buffer 15 at the central location 10 is able to accept an input message segment, it serially scans the branches via their respective telephone lines 20a looking for a REQUEST TO INPUT control signal. When the buffer finds such a control signal being sent by a branch, as it will for branch #1 in the present example, it stops scanning, locks onto the branch #1 scan position, sends an O.K. TO INPUT control signal thereto, and gets prepared to receive an input message segment.

(5) When the branch controller 30 of branch #1 receives the O.K. TO INPUT control signal from the buffer 15, an input message segment of 18 binary coded digits of seven bits each is sent serially bit by bit to the buffer 15. This first input message segment sent to the buffer includes the settings of the window machine keyboard switches (which for the first input message segment corresponds to the customer's old balance), the particular number assigned to machine #1 (which is different for each window machine in the entire system), the scan position of window machine #1 with respect to the controller 30 of branch #1, a parity bit for each binary coded digit, and a longitudinal parity digit. FIG. 7 illustrates a typical input message format which may be employed. It will be noted that digit position 2 is empty, but this is merely a matter of choice and permits an additional binary coded digit of information to be sent if so desired.

(6) The buffer 15 receives the 18 digit input message segment sent by branch #1, loads it into a buffer register provided in the buffer 15, and checks the input message segment for parity. Either (a) or (b) below then occurs.

(a) If an error is found, the buffer 15 voids the input message segment and sends out a MESSAGE ERROR control signal to the branch controller 30 of branch #1 which in turn sends a signal to window machine #1 via its respective electronics unit 40a to cause illumination of the window machine error lamp. Both the buffer 15 and the branch controller 30 are then released for further scanning so as to be able to attend to other window machines. The window machine error lamp advises the teller to press the VOID key which voids the previous keyboard entry and the teller must repeat the particular entry for which the error occurred, but need not repeat any previous entry which was sent without error.

(b) If no error is found by the buffer 15 in receiving the first input message segment from branch #1, then the buffer 15 sends out a MESSAGE O.K. signal to the branch controller 30 of branch #1. This MESSAGE O.K. signal causes the branch controller 30 to resume scanning and an appropriate lamp to be illuminated on the window machine keyboard to inform the teller that the window machine is ready to receive the second entry (which in the typical example being considered here is the transaction, such as a deposit or withdrawal).

(7) Assuming that the first input message segment is received without error, the buffer 15 retains the input message segment in its buffer register and signals the data processor 12 that it is ready to feed an input message segment thereto. When the data processor 12 signals that it is ready to accept an input message segment, the buffer 15 feeds the first input message segment stored in the buffer register serially, decimal digit by decimal digit (along with the branch #1 scan position number) to the data processor 12 where it is appropriately stored therein to await receipt of the remaining input message segments from window machine #1. After feeding the first input message segment to the data processor 12, the buffer 15 is free to resume scanning.

(8) After the teller's second entry constituting the transaction is transferred to the keyboard switches as a result of the teller having depressed a deposit or withdrawal key, and the branch controller 30 again locks on window machine #1, the same steps described above for the first input message segment are repeated for the second input message segment, culminating in the feeding and storage of the second input message segment in the data processor 12 along with the first input message segment.

(9) After the third entry of the teller (which is the customer's account number) operation also occurs in the same manner as described above for the first input message segment, culminating in the feeding of the third input message segment to the data processor. However, the signal derived as a result of the teller depressing an account number control key (such as A ACCOUNT NUMBER), when received by the data processor, serves as a signal to tell the processor that the input message is completed. Also, as a result of the teller depressing an account number control key in making the third entry, the window machine keyboard is locked out to prevent manual entry by the teller until the data processor has responded with an output message. In addition, an appropriate lamp is illuminated on the keyboard to inform the teller that the window machine is awaiting the receipt of an output message from the processor.

*Output information flow—(From processor to window machine)*

(1) As a result of receiving the final input message segment which contains a signal derived from the depression of an account number control key, the data processor begins processing the input message. First, using the customer's account number contained in the third input message segment, the data processor 12 selects the customer's account record from the random access unit 13 and compares the customer's old balance contained in the first input message segment with the balance stored in the customer's account record. If they agree, the processor 12 then applies the transaction contained in the second input message segment to update the customer's account record, which is then returned to the random access unit 13. Also, an output message consisting of a single output message segment is assembled by the processor which contains the same transaction as was contained in the second input message segment. The processor 12 then signals the buffer 15 that it is ready to send an output message segment thereto.

(2) When the buffer 15 is signaled that the processor is ready to send an output message segment, the buffer 15 completes the handling of any message segment with which it may be involved and then proceeds directly to prepare to receive the output message from the processor 12 without handling any other input messages—that is, an output message segment has priority over an input message segment. Also, while the buffer 15 is busy completing a previous transaction, it will provide a signal to the processor 12 which gives the processor the option of either waiting or doing other work until the buffer indicates it is ready.

(3) When the buffer is ready to receive an output message from the processor, it provides an appropriate signal to the processor which causes the processor to feed the output message binary coded digit by binary coded digit (along with the scan position number of the branch for which the output message segment is intended) to the buffer 15 where it is stored in the buffer register.

(4) After being loaded with an output message segment from the processor, the buffer sends a REQUEST TO OUTPUT control signal to branch #1 and the processor is released to perform other activity; however, the processor still retains the output message segment just sent until it receives an indication from the buffer that the output message segment was properly received by the window machine.

(5) Without waiting for an answer from branch #1, the buffer 15 sends an output message segment of 18 binary coded digits of seven bits each to branch #1, the first digit of which corresponds to the scan position of window machine #1 and causes the controller 30 of branch #1 to try and select window machine #1. A typical output message segment is illustrated in FIG. 8. It will be noted that this typical output message segment is similar to the input message segment of FIG. 7, except for digit positions 12 and 13. In the input message segment, digit positions 12 and 13 are used to identify the window machine. In the output message segment, digit position 12 controls the window machine keyboard lights 125 (FIG. 3), and digit position 13 controls what type of automatic second cycle is to be provided—such as a balance cycle at the end of an output message, or a sub-balance cycle at the end of an output message segment where other output message segments are still to follow.

(6) When the branch #1 controller tries to select window machine #1 in response to receiving the window machine scan position, there are various possible situations that can occur as indicated by (a) and (b) below:

(a) If window machine #1 is ready to accept an entry when the controller tries to select window machine #1 in response to the scan position number in digit position 1 of the output message, then selection occurs and the window machine keyboard solenoids (FIG. 6) are set in accordance with respective digits of the output message segment, the buffer providing a sufficient time interval after the transmission of keyboard digits so as to give the keyboard solenoids a sufficient chance to operate. Since zero digits as well as other non-solenoid digits do not require solenoids to be set, no such waiting interval is provided. In order to give the controller 30 a chance to fully check the parity of the output message segment sent by the buffer, activation of the solenoid corresponding to the key which will initiate a window machine cycle (such as the keys in control row 3 in FIG. 3a) is delayed until parity is checked. If parity checks out okay, a MESSAGE O.K. signal is sent by the controller 30 to the buffer 15 which causes the buffer 15 to notify the processor that the output message segment was properly received by window machine #1, the buffer then releasing to attend to other branches. A correct parity check also permits the controller to activate the remaining cycle-initiating solenoid of window machine #1, causing the window machine to cycle and the controller 30 to be released to attend to other window machines. A second cycle is then automatically initiated by the electronics unit 40a of window machine #1 by causing depression of an appropriate cycle-initiating key (such as the SUB BALANCE or BALANCE key) in accordance with the automatic cycle digit in digit position 13 of the output message segment. An appropriate lamp in the window machine keyboard may be illuminated as determined by the lamp information in digit position 12 of the output message segment.

(b) If window machine #1 is busy when the controller tries to select window machine #1 in response to receiving the window machine scan position in digit position 1 (FIG. 8), or if the controller finds a parity error, then the branch #1 controller will send a MESSAGE ERROR control signal to the buffer 15 which causes the buffer to signal the processor that the output message segment could not be received by window machine #1, whereupon the processor releases to attend to other window machines, or to do other work, and will not try to send this same output message segment for a predetermined time. If a parity error caused the MESSAGE ERROR control signal to be sent by the controller, an appropriate lamp on the keyboard of window machine #1 will be illuminated to inform the teller that he should depress the VOID key in order to wipe out any portion of the output message segment which was entered in the window machine keyboard by the processor.

(7) Any other output message segments from the processor are handled in the same manner as just described above. As far as a particular window machine is concerned, it recognizes the end of an output message (which may consist of a plurality of output message segments) as a result of the BALANCE key being activated in accordance with the automatic cycle digit in digit position 13 of an output message segment. Thus, the signal which causes depression of the BALANCE key signifies the end of an output message just as a signal derived from depression of an account number key (such as A ACCOUNT NUMBER) signifies the end of an input message.

Illustrative system mechanization

An illustrative system mechanization will now be presented to show how the previously described operations can be mechanized. It will of course be appreciated that logical functions and operations can be mechanized in many different ways. From the viewpoint of the present invention, the invention resides primarily in the discovery of the type, order, arrangement and character of the particular functional operations which will give the most advantageous on-line banking system (as described previously herein), and not in the detailed logical mechanization employed which may take various forms. Consequently, wherever possible, well-known block representations will be employed rather than specific structure or circuitry in order not to obscure the description with insignificant details. Also, only the mechanization required for a typical situation will be shown, since this will serve as a sufficient illustration of mechanization, it being understood that many variations are possible, and that additional logical functions and operations may be added as desired.

The illustrative mechanization will be presented in two parts. The first part will consider the mechanization at a typical branch using FIGS. 9 and 10. FIG. 9 illustrates a window machine 40 and its associated electronics unit 40a, and FIG. 10 illustrates a branch controller 30. The second part will consider the mechanization at the central accounting location using FIG. 11 which illustrates a typical buffer 15. It will be noted that each of FIGS. 9, 10 and 11 require two sheets, the respective figures being designated as 9a and 9b corresponding to FIG. 9, 10a and 10b corresponding to FIG. 10, and 11a and 11b corresponding to FIG. 11.

Some initial points concerning various conventions used in FIGS. 9–11 will be helpful in understanding the description to follow. First, it will be noted that, in addition to the use of various labeled block representations in FIGS. 9–14, conventional AND and OR gates are appropriately illustrated as semicircles, a "plus sign" in the semicircle indicating an OR gate, and a "dot" in the semicircle indicating an AND gate. As is well known, an OR gate will provide a true output when any of its inputs are true, while an AND gate will provide a true output only when all of its inputs are true. When many related gates are involved, they are represented in a single block for the sake of simplicity (such as the input message gates 200 in FIG. 9a), the enabling signals for such block-represented gates (such as 210a in FIG. 9a) being applied to the block perpendicularly to the data and other signals controlled thereby. A similar manner of designation is also used for the enabling signals of other block representations, such as for example the binary to decimal converter 305, and the control character decoder 310 in FIG. 10b.

It is also to be noted in FIGS. 9–11 that, in order not to confuse the figures with an excessive number of lines, various particular lead lines which are treated as a group (such as $I_1$–$I_9$ and $O_1$–$O_9$ in FIGS. 9a and 9b) are bracketed together (such as by brackets 161a and 161b in FIGS. 9a and 9b) into a single composite lead line (such as 162 in FIG. 9a) when they are to run any significant distance in the figures. Each such composite lead line is appropriately unbracketed and labeled at suitable locations to permit the particular group of lead lines represented thereby to be readily identified.

Also, where all or a portion of a particular group of lines are to be fed to more than one block, the composite lead line corresponding thereto is treated as a single line with a "dot" provided at the branch point to indicate a common connection between respective lines, such as illustrated for example at 270a in FIG. 9a. Where only a portion of the lead lines of a group are branched off, as at 271 in FIG. 9a, the particular lines which are branched off are appropriately labeled. If there is no labeling of particular lines at a branch point of a composite lead line, it can be assumed that all of the lead lines in the group represented thereby are common to both branches.

It is further to be noted that, for convenience, signals and lead lines are provided with the same designation. For example, the designation $I_1$–$I_9$ in FIG. 9a refers to the lead lines as well as the respective signals which appear thereon. In addition, to aid in understanding FIGS. 9–11, designations for signals (or lines) associated with input messages are chosen to include a capital "I" in their designation (such as $ID_3$–$ID_{17}$, $IP_0$, $IX_0$, etc.), while designations for signals associated with output messages are chosen to include a capital "O" in their designation (such as $OD_3$–$OD_{17}$, $OP_0$, $OX_0$, etc.). Also components of the window machine 40 are designated by 100 series numerals, its associated electronics unit 40a by 200 series numerals, the branch controller 30 by 300 series numerals, and the buffer 15 by 400 series numerals. Still further, it will be helpful to note that the "a" parts of FIGS. 9–11 (that is 9a, 10a and 11a) are primarily concerned with input message functions while the "b" parts of FIGS. 9–11 (that is 9b, 10b and 11b) are primarily concerned with output message functions.

Another point which is worth noting at this time is with regard to the operation of the various flip-flops and counters illustrated in FIGS. 9–11, such as for example the input select flip-flop 210 in FIG. 9a and the input program counter 300. The operation of these flip-flops and counters is chosen so that the operation of the counter or flip-flop in response to a true input is appropriately delayed (such as by making the counters and flip-flops responsive to the trailing edge of the true input pulse) so as to avoid retriggering problems. Thus, when referring to FIGS. 9–11, it should be recognized that when a true input signal is applied to a counter or flip-flop, the respective counter or flip-flop will remain in its last state until the true input signal is removed.

It is further to be noted with respect to FIGS. 9–11 that the cooperation of the buffer 15 at the central location is illustrated for only one branch and for only one window machine 40 and its associated window machine electronics 40a in the branch. However, since other branches and other window machines are connected and operated in a similar manner, the description of FIGS. 9–11 will suffice to illustrate the construction and operation of all. In order to clearly indicate how the branch controller 30 is connected to the eight exemplary window machines 40 provided at a branch via their respective electronics units 40a, those lines emanating from the right side of the branch controller 30 in FIGS. 10a and 10b which are respectively connected in parallel with all of the associated electronics units are marked with an "X." The other lines emanating from the right side of the controller 30 in FIGS. 10a and 10b are each designated with numerical subscripts (1, 2, 3, . . . 8) which correspond to the particular one of the eight window machine associated electronics units 40a for which each such line is intended (such as lines $IW_1$–$IW_8$ for example).

As a final area of consideration before beginning the description of a typical mechanization, it will be helpful to briefly summarize the general logical design approach which is employed in the exemplary mechanization.

The design approach employed in the exemplary mechanization is a conventional one in which an overall operation is performed in a series of sub-operations. It is convenient to provide for the performance of the various sub-operations by means of what is generally referred to as a program counter, each program count of which corresponds to one sub-operation. The program counter is nothing more than a conventional type counter whose advancement is controlled by appropriate input logic operating in dependence on control and data signals. The output program counts of the program counter are fed to appropriate logical circuitry to render operative, during each program count, the particular logical circuitry required for the performance of the particular sub-operation to which each program count corresponds. The mechanization can thus be most expeditiously described by considering what happens during each program count, and the conditions which determine the advancement from one count to another.

Four program counters are employed in the typical mechanization illustrated in FIGS. 9–11, two of these being involved in controlling input message segments, and the other two being involved in controlling output message segments. One input program counter 300 and one output program counter 320 are located in the branch controller 30 (FIGS. 10a and 10b), and the other input program counter 400 and the other output program counter 420 are located in the buffer 15 (FIGS. 11a and 11b). The lines emanating from the right side of each program counter in FIGS. 9–11 represent its respective program counts. The logic circuitry provided pointing to the program count designations arranged along the top or bottom edge of each program counter indicates the conditions for advancement.

For convenience of description, the branch mechanization and the buffer mechanization will be considered separately, as will also the input and output operations of each. Appropriate headings will be used to indicate which portion of the system is being considered, whether an input or an output operation is involved, and the particular program count of the respective program counter which corresponds to the particular events being described. It is to be understood that such circuitry as drivers, amplifiers, filters and the like which may be desired at various points from a detailed circuit design viewpoint have not been specifically illustrated in FIGS. 9–11. This has been done in order not to unduly confuse the figures with details which can readily be provided within the skill of the art. It can therefore be assumed that detailed circuitry of this type is included where desirable along with or as part of those components which are illustrated in FIGS. 9–11.

I. BRANCH MECHANIZATION (FIGS. 9 AND 10)

(A) *Branch input operations.*—(Program counts $IP_0$, $IP_1$, $IP_2$, $IP_3$, $IP_{o.k.}$, and $IP_e$ of input program counter 300 in FIG. 10a.)

*1. Program count $IP_0$*

During $IP_0$ (which may be considered as a rest count for the input program counter 300), and assuming that the output program counter 320 (FIG. 10b) is also in its

17 rest count $OP_0$), then both $IP_0$ and $OP_0$ will be true to cause pulses from a scan clock 301 (which may typically run at 2,000 cycles per second) to be applied (through AND gate 303 and OR gate 304) to the "count" input of a scan counter 302. The scan counter 302 is provided with eight scan counts $IS_1$ to $IS_8$ (one for each window machine) which become true in sequence as the scan counter 302 counts in response to the applied pulses from the scan clock 301. These scan output counts $IS_1$ to $IS_8$ are fed from the branch controller 30 to respective ones of the eight window machines 40 via their respective electronics units 40a, as indicated in FIG. 9a for the window machine corresponding to scan count $IS_1$.

As typically illustrated in FIG. 9a, each window machine 40 is provided with a "ready to input" switch 150 which will be closed only if the respective window machine is ready to input—that is, if an entry made by the teller is in the keyboard switches (FIG. 4) waiting to be read out. Thus, assuming that the window machine illustrated in FIGS. 9a and 9b, is ready to input so that the ready to input switch 150 is closed, then, when the scan counter 302 (FIG. 10a) causes scan count $IS_1$ to become true, the closed ready to input switch 150 will feed the true count $IS_1$ back along line $IM_1$ to the branch controller 30 (via its respective electronics unit 40a) to cause the input program counter 300 (FIG. 10a) to be advanced from $IP_0$ to the next program count $IP_1$ (again assuming that output program counter 320 in FIG. 10b is in rest count $OP_0$). The advance of the input program counter 300 to $IP_1$ in response to the returned true signal along line $IM_1$ occurs sufficiently fast so that the scan counter 302 is frozen in scan count $IS_1$.

2. Program count $IP_1$

Program count $IP_1$ is applied to a control signal generator 307 (FIG. 10a) to cause generation of a REQUEST TO INPUT control signal in binary coded form. This REQUEST TO INPUT control signal is fed to a transmitter and converter 309 provided at the branch for the purpose of transmitting signals from the branch to the central accounting location by way of the telephone lines 20a (FIG. 1) connected therebetween. The transmitter and converter 309 continuously provides clock pulses $C_t$ (which may typically have a repetition rate of 2,000 cycles per second) for the purpose of indicating when the transmitter and converter 309 is ready to receive a binary coded signal for transmission. These clock pulses $C_t$ are fed to the control signal generator 307 so that the REQUEST TO INPUT control signal can be fed to the transmitter and converter 309 at the proper times during $IP_1$. These same transmitter clock pulses are also fed to other logical circuitry in the branch controller 30 to likewise control the time of feeding of signals to the transmitter and converter 309. Also, these transmitter clock pulses $C_t$ are preferably synchronized with the clock pulses of the scan clock 301. Typically, the transmitter and converter 309 accepts the bits of each binary coded signal in parallel, and then converts the signal to serial form for transmission in order to minimize the number of telephone lines required.

The input program counter 300 remains in program count $IP_1$ until an O.K. TO INPUT control signal is received by the branch from the central accounting location, again via the telephone lines 20a. As with all signals sent to the branch from the central location, the O.K. TO INPUT control signal is received by a receiver and converter 311 (FIG. 10b) which receives and converts the signal from the serial form in which it is transmitted into binary coded form for use by the branch controller 30. Also, one of the seven bits of each coded binary digit which is transmitted is used to identify whether the digit represents data (such as an amount row magnitude) or a control signal (such as the O.K. TO INPUT control signal). This identifying bit is used by the receiver and converter 311 to generate either a data clock pulse $C_d$ when the digit received is a data signal, or a control signal clock pulse $C_c$ when the digit received is a control signal. These clock pulses $C_c$ and $C_d$ are used in properly directing a received binary coded digit appearing at the output of the receiver and converter 311 to the remainder of the branch. Also, it is preferable that the clock pulses $C_c$ and $C_d$ be in synchronism with the clock pulses $C_t$ produced by the transmitter and converter 309 (as indicated by interconnecting line 311a)—that is, the clock pulses may have different repetition rates, but when they do occur together they are in phase. Typically, the transmitter and converter 309 and the receiver and converter 311 may employ what is known in the art as a Bell System Data Set 201A, which is a modulator-demodulator designed to transmit and receive data over a switched voice frequency telephone circuit or a private line at a transmission rate of up to 2,000 bits per second.

When the O.K. TO INPUT control signal is sent to the branch from the central location, it will be applied to the receiver and converter 311, which in turn will feed the O.K. TO INPUT signal in binary coded form to a control character decoder 310 (FIG. 10b) activated by the control clock pulse $C_c$ produced by the receiver and converter 311 when the binary coded form of the O.K. TO INPUT appears at the output thereof. The control character decoder 310 decodes the binary coded O.K. TO INPUT control signal applied thereto, causing its respective O.K. TO INPUT output line to become true to act through AND gate 313 to advance the input program counter 300 (FIG. 10a) to its next program count $IP_2$.

3. Program count $IP_2$

In addition to causing advancement of the input program counter 300 to $IP_2$, the true O.K. TO INPUT signal appearing at the output of the control character decoder 310 (FIG. 10b) results in a true selection signal being sent (as a result of the action of AND gates 314 and 315 in FIG. 10a) over selection line $IW_1$ (FIG. 10a) to the electronics unit 40a (FIG. 9a) of the window machine corresponding to the frozen scan count $IS_1$ of the scan counter 302. The true signal $IW_1$ turns on the input select flip-flop 210 (FIG. 9a) to enable the respective input message gates 200 so as to establish, during program count $IP_2$, the communication required between the branch controller 30 and the selected window machine for transmission of the eighteen digit input message illustrated in FIG. 7 to the central accounting location.

The first digit to be transmitted is the scan position of the selected window machine. This scan position digit is applied to the transmitter and converter 309 at the next transmitter clock pulse $C_t$ following the advancement of the input program counter 300 to $IP_2$ using the scan counts $IS_1$ to $IS_8$ which are applied to respective AND gates 321–328, whose outputs are in turn applied to a decimal to binary converter 325a activated by $IP_2$ and the transmitter clock pulses $C_t$. An input digit counter 330 (FIG. 10a) is initially at its first count $ID_1$ during $IP_0$ and is sequentially advanced through its counts $ID_1$–$ID_{18}$ by transmitter clock pulses $C_t$ occurring during $IP_2$. The digit counts $ID_1$–$ID_{18}$ of the digit counter 330 are used to identify the digits of the eighteen digit input message segment as they are sent, and to energize the appropriate logical circuitry for each digit. Thus, at the first transmitter clock pulse $C_t$ following advancement of the input program counter 300 to $IP_2$, the input counter will still be in count $ID_1$ (since all counters change only in response to the trailing edge of the input true pulse as pointed out previously) so that AND gates 321–328 will be enabled to pass the scan position information to the decimal to binary converter 325a and then onto the transmitter and converter 309 as the first digit of the input message segment.

As indicated in FIG. 7, the next digits of significance to be sent to the central location are digits 3–11 (the second digit is blank), and this is accomplished as the transmitter clock pulses $C_t$ cause the input digit counter 330 (FIG. 10a) to count during $IP_2$ through counts $ID_3$–$ID_{11}$, which counts are fed through the input message gates 200 (FIG. 9a) of the selected window machine to the rows of the window machine keyboard switches (FIG. 4) corresponding to the nine amount rows (FIGS. 3 and 3a). Thus, for each of the digit counts $ID_3$–$ID_{11}$, an appropriate one of the input signals $I_0$–$I_9$ is read out from the keyboard switches and sent to the transmitter and converter 309 via the input gates 200 and the decimal to binary converter 325a, whereby the entry made in the amount rows by the teller will be transmitted to the central accounting location, as previously described in connection with FIG. 4.

The next two digits 12 and 13 (FIG. 7) to be sent to the central accounting location provide a two-digit number which uniquely identifies the selected window machine from all other window machines in the system. This identifying number is provided by suitable window number circuitry 201 (FIG. 9a) whose output is fed through gates 202 (enabled by digit counts $ID_{12}$ and $ID_{13}$) and through the input message gates 200 and the decimal to binary converter 325a to the transmitter and converter 309 (FIG. 10a) for transmission to the central accounting location.

The next four digits 14–17 (FIG. 7) correspond to the control rows of the window machine keyboard (FIGS. 3 and 3a) and these are read out from the window machine keyboard switches (FIG. 4) and sent to the transmitter and converter 309 in response to digit counts $ID_{14}$–$ID_{17}$ in the same way as are the nine amount rows in response to digit counts $ID_3$–$ID_{11}$.

The last digit to be applied to the transmitter and converter 309 is a sum parity digit (also called a sum check digit) which brings the entire eighteen digit input message segment into a predetermined parity for checking of accuracy of transmission at the central accounting location. Each binary coded digit also includes its own parity bit which is also checked at the central location. The parity bit of each binary coded digit is generated by the decimal to binary converter 325a (FIG. 10a), while the sum parity digit (which is the eighteenth digit of the input message segment) is generated by a sum parity generator 333 (FIG. 10a) activated during each transmitter pulse $C_t$ of the program count $IP_2$. When the transmitter clock pulse $C_t$ occurs during the last digit count $ID_{18}$, the sum parity generator 333 is caused to feed its resultant sum parity digit to the transmitter and converter 309 for transmission to the central location.

The transmitter clock pulse $C_t$ occurring when the input digit counter 330 (FIG. 10a) is in digit count $ID_{18}$ returns the input digit counter 330 to its inital count $ID_1$, and advances the input program counter 300 to the next count $IP_3$.

*4. Program count $IP_3$*

During $IP_3$, the branch controller 30 awaits receipt of either a MESSAGE O.K. or a MESSAGE ERROR signal from the central location. There are three possibilities that can occur.

(a) If a MESSAGE O.K. signal is sent from the central location, the control character decoder 310 (FIG. 10b) MESSAGE O.K. output line becomes true to cause the input program counter 300 to advance to program count $IP_{o.k.}$.

(b) If a MESSAGE ERROR signal is sent from the central location, the MESSAGE ERROR output line of the control character decoder (FIG. 10b) becomes true to cause the input program counter 300 to advance to program count $IP_e$.

(c) If for any reason no message is received from the central location, then a timer 335 (FIG. 10a) (which is energized during $IP_3$) will run out and produce an output pulse to also advance the input program counter 300 to program count $IP_e$, which resets the timer 335.

*5. Program count $IP_{o.k.}$*

Program count $IP_{o.k.}$ is fed to the selected window machine through input message gates 200 (FIG. 9a) to a lamp memory 215, which in turn causes illumination of an appropriate one of the lamps 125 on the window machine (FIG. 3) to indicate to the teller that he may make the next entry. If the just read out teller entry included depression of an account number key, then the lamp memory 215 acts to cause illumination of another one of the window machine lamps 125 to indicate that the input message is completed and the teller must now await an output message from the processor.

At the next transmitter clock pulse $C_t$ following advancement of the input program counter 300 to $IP_{o.k.}$ the program counter will be advanced back to its rest program count $IP_0$, which turns off the input select flip-flop 210 (FIG. 9a) to break communication between the branch controller 30 and the selected window machine 40. It should be noted that the program count $IP_{o.k.}$ is also fed to the count input of the scan counter 302 (FIG. 10a) through OR gates 341 and 304 in order to permit the scan counter 302 to start at the next scan count when the input program counter 300 returns to $IP_0$.

*6. Program count $IP_e$*

Program count $IP_e$ is fed to the lamp memory 215 (FIG. 9a) of the selected window machine through input message gates 200 (FIG. 9a) which causes illumination of an appropriate one of the lamps 125 (FIG. 3) on the window machine to indicate to the teller that an error occurred during handling of the previous entry, whereby the teller is advised to depress the VOID key and repeat the previous entry. Upon depression of the VOID key, a signal is sent to the lamp memory 215 (FIG. 9a) to reset the error lamp and cause illumination of an appropriate lamp to indicate to the teller that the window machine is ready for an entry.

At the next transmitter clock pulse $C_t$ following advancement of the input program counter 300 to $IP_e$, the input program counter 300 is advanced back to its rest program count $IP_0$ which turns off the input selected flip-flop 210 (FIG. 9a) to break communication between the branch controller 30 and the selected window machine 40. It should be noted that the program count $IP_e$ is also fed to the count input of the scan counter 302 (FIG. 10a) through OR gates 341 and 304 in order to permit the scan counter 302 to start at the next scan count when the input program counter 300 returns to $IP_0$.

(B) *Branch output operations.*—(Program counts $OP_0$, $OP_1$, and $OP_{o.k.}$, of output program counter 320 in FIG. 10b.)

*1. Program count $OP_0$*

During $OP_0$ (which is the rest count for the output program counter 320) the branch output circuitry remains quiescent and the true state of $OP_0$ permits the branch controller 30 to handle input message segments. The output program counter 320 remains in $OP_0$ until the REQUEST TO OUTPUT line of the control character decoder 310 (FIG. 10b) becomes true to advance the output program counter 320 to $OP_1$. This occurs in response to a REQUEST TO OUTPUT control signal sent by the buffer 15 at the central accounting location when it is going to send an output message segment to the branch, which it will do regardless of the conditions at the branch or the window machine for which the output is intended.

*2. Program count $OP_1$*

During $OP_1$, the data clock signals $C_d$ produced by the receiver and converter 311 (FIG. 10b) (in response to the appearance at the output thereof of each data digit of the eighteen digit output message segment sent from the central location) are used to advance the counts $OD_1$–$OD_{18}$ of an output digit counter 352 (FIG. 10b)

which is initially in digit count $OD_1$. These digit counts $OD_1$–$OD_{18}$ are used to identify the digits of the eighteen digit output message segment (FIG. 8) as they are received, and to energize the appropriate corresponding logical circuitry for each digit. The data clock signals $C_d$ are also used during $OP_1$ to control the operation of a binary to decimal converter 305 (FIG. 10b) which converts data signals from the binary coded form in which they appear at the output of the receiver and converter 311 into decimal form. The binary to decimal converter 305 operates so as to retain each digit at its output until changed by the data clock signal $C_d$ of the next digit.

The first digit of the eighteen digit output message segment appearing during $OP_1$ is the scan position number of the window machine and occurs when the output digit counter 352 is still in its initial count $OD_1$. Consequently, the gates 354 (FIG. 10b) are enabled during receipt of this first digit to permit the binary to decimal converter 305 to cause a selected one of the eight selection lines $OW_1$ to $OW_8$ (one for each window machine) to become true. These selection lines $OW_1$ to $OW_8$ are fed from the branch controller 30 to respective ones of the eight window machines 40 via their respective electronics units 40a, as indicated in FIG. 9b for the window machine corresponding to selection line $OW_1$.

As typically illustrated in FIG. 9b, each window machine 40 is provided with a "ready for output" switch 175 which will be closed only if the respective window machine is ready for output—that is, if the teller has completed the input entries and the window machine is in a condition awaiting an output message segment. Assuming that the window machine illustrated in FIGS. 9a and 9b is ready to accept an output (in which case the ready for output switch 175 will be closed), then, when selection line $OW_1$ becomes true during $OP_1$ (in accordance with the value of the first digit of the output message segment), a true signal will be applied through switch 175 to turn on the respective output select flip-flop 255 (FIG. 9b). The turning on of flip-flop 255 enables the respective output message gates 230 to thereby establish, during $OP_1$, the communication required between the branch controller 30 and the selected window machine to permit energizing the window machine keyboard solenoids (FIGS. 5 and 10b) in accordance with respective digits $OD_3$–$OD_{11}$ and $OD_{13}$–$OD_{17}$ of the output message segment.

As indicated in FIG. 8, the next digits of significance which will be received from the central location are digits 3–11 (the second digit is blank) corresponding to the nine amount rows (FIGS. 3 and 3a) of the keyboard. The corresponding output message digit counts $OD_3$–$OD_{11}$ are fed through the output message gates 230 to the rows of the keyboard solenoids (FIG. 5) which correspond to the nine amount rows (FIGS. 3 and 3a). Then, as each of the amount row digits appear at the output of the receiver and converter 311, they will be converted into decimal form by the binary to decimal converter 305 (FIG. 10b), and sent via output message gates 230 as signals $O_1$–$O_9$ to respective columns of the keyboard solenoids to cause energization of respective keyboard solenoids (as previously explained in connecton with FIG. 5). Since the outputs of the binary to decimal converter 305 (FIG. 10b) and the output digit counter 352 (FIG. 10b) remain fixed between receipt of the digits, the delay between the transmission of digits determines the period from the central location for which energization signals are applied to the respective keyboard solenoids. The transmission of digits of the input message by the central accounting location is thus appropriately delayed as necessary to provide sufficient time for the solenoids to be set by their respective energization signals.

The next digit 12 (FIG. 8) received from the central accounting location contains information as to the desired setting of the lamps 125 (FIGS. 3 and 9a) of the window machine. After passing through the output message gates 230, this twelfth digit is fed via AND gates 232 (FIG. 9b) (which are energized by digit count $OD_{12}$) to the lamp memory 215 for appropriately setting lamps 125.

The next digit 13 (FIG. 8) received from the central accounting location contains information as to the type of automatic second cycle, if any, is to be initiated by the window machine after its first cycle is completed. Since this information is not ready to use by the window machine at the time when it appears, it is sent to suitable storage 240 (FIG. 9b) activated in response to digit count $OD_{13}$.

The next three digits to be received are digits 14–16 (FIG. 8) corresponding to control rows 4, 1 and 2 (FIG. 3a), respectively. The keyboard solenoids corresponding to these digits are energized in response to digit counts $OD_{14}$–$OD_{16}$ in the same way as those for the nine amount rows.

The next digit to be received is digit 17 corresponding to control row 3. Since energizing of its respective solenoid will cause the window machine to cycle and print out on the customer's passbook, it is desirable to hold off energization of its respective solenoid until the sum parity digit (digit eighteen) is checked. This is accomplished by storing digit seventeen in suitable storage 240 (along with digit 13) in response to digit count $OD_{17}$.

The eighteenth and final digit of the output message segment to be received is the parity digit which is fed to a parity check circuit 356 (FIG. 10b), as are all of the other seventeen digits. The parity check circuit 356 checks the parity of each individual digit during $OP_1$ in response to each clock data signal $C_d$, and checks the overall sum parity of the complete output message segment when the parity sum digit arrives. If parity checks out fully when the clock data pulse $C_d$ occurs during digit count $OD_{18}$, then a true PARITY O.K. output pulse is produced by the parity check circuit 356; if parity does not check out, either on an individual digit or on the longitudinal sum, then the parity check circuit 356 produces a PARITY ERROR output pulse when $C_d$ occurs during digit count $OD_{18}$. This PARITY ERROR pulse is applied to the lamp memory 215 (FIG. 9a) via OR gate 281 and the output message gates 230 to permit illumination of a suitable one of the window machine lamps (FIGS. 3 and 9a) so as to advise the teller that he should press the VOID key to remove any information which may have been set up in the window machine.

There are four possibilities that can occur when the data clock pulse $C_d$ occurs at digit count $OD_{18}$ of program count $OP_1$.

(a) If parity checks out so that a PARITY O.K. signal is produced by the parity check circuit 356, and if in addition line $OM_1$ (FIG. 10b) is true (as a result of the ready for output switch 175 in FIG. 9b having been closed to permit the output select flip-flop 255 to have turned on during digit count $OD_1$ of program county $OP_1$), then, when the PARITY O.K. signal occurs during $C_d$ of the last digit count $OD_{18}$, the output program counter 320 will advance to $OP_{o.k.}$. It is to be noted that only line $OM_1$ of the selected window machine can be true at $C_d$ of $OD_{18}$, since only the corresponding select line $OW_1$ receives a true signal during $OD_1$ of $OP_1$ in response to the scan position number represented by the first digit of the output message.

(b) If parity does not check out so that a PARITY ERROR signal E is produced when $C_d$ occurs during $OD_{18}$, then the output program counter 320 will advance back to its rest program count $OP_0$, as a result of which the output select flip-flop 255 (FIG. 9b) will be turned off to break communication between the branch controller 30 and the selected window machine 40.

(c) If parity checks out, but the output select flip-flop 255 was not turned on because the ready for output switch 175 was open during $OD_1$ of $OP_1$ (indicating that the selected window machine was not ready to receive an output), then line $OM_1$ will not be true (in which case none of the lines $OM_1$–$OM_8$ will be true) and the output program counter 320 will be advanced back to its rest program count $OP_0$ when $C_d$ occurs at $OD_{18}$. The numeral 360 in the input logic to program count $OP_0$ designates an inverter which is provided for the purpose of providing a true signal to AND gate 361 when none of the lines $OM_1$–$OM_8$ are true.

(d) If for some reason the ouput digit counter 352 never reaches $OD_{18}$ (because, for example, communication fails between the branch and the selected location), then a timer 390 (FIG. 10b) (which runs during $OP_1$ until digit count $OD_{18}$ is reached) will run out and produce an output pulse 390a to advance the output program counter 320 back to its rest count $OP_0$, which returns the output digit counter 352 to its initial count $OD_1$ and resets the timer 390.

The output pulse 390a from the timer 390 is also fed via OR gate 281 (FIG. 10b) and the output message gates (FIG. 9b) to the lamp memory 215 (FIG. 9a) to permit an appropriate one of the window machine lamps 125 (FIGS. 3 and 9a) to be illuminated to advise the teller to depress the VOID key to de-energize any keyboard solenoids which might have been set.

3. Program count $OP_{o.k.}$

Program count $OP_{o.k.}$ to which the output program counter is advanced when the output message is properly received is fed to the associated electronics unit 40a of the selected window machine to trigger a pulse generator 260 (FIG. 9b). When triggered by $OP_{o.k.}$ the pulse generator 260 produces two output pulses $OJ_{13}$ and $OJ_{17}$, appropriately spaced in time, which are fed to the storage 240 (FIG. 9b) to cause digits 17 and 13 previously stored therein to be properly applied to the respective window machine solenoids so as to permit the window machine to be cycled (either once or with an optional second cycle) as dictated by the values of digits 13 and 17.

At the next transmitter clock pulse $C_t$ following advancement of the output program counter 320 to $OP_{o.k.}$, the output program counter will be advanced back to its rest count $OP_0$. Return to the rest count $OP_0$ causes resetting of the parity check circuit 356 (FIG. 10b) and resetting of the output digit counter 352 to $OD_1$ if it is not already there. Return to the rest count $OP_0$ also causes resetting of the output select flip-flop 255 (FIG. 9b) to break communication between the branch controller 30 and the selected window machine.

II. BUFFER MECHANISM (FIG. 11)

(A) *Buffer input operations.*—(Program counts $IX_0$, $IX_1$, $IX_2$ $IX_{o.k.}$, $IX_c$, $IX_3$ and $IX_8$ of input program counter 400 in FIG. 11a).

1. Program count $IX_0$

During $IX_0$ (which is the rest count for the input program counter 400) and assuming that the output program counter 420 (FIG. 11b) is also in its rest count $OX_0$, then both $IX_0$ and $OX_0$ will be true to permit a scan counter 402 (FIG. 11a) to be sequentially advanced through its three scan counts $N_1$, $N_2$ and $N_3$ (one for each branch) by clock pulses obtained from a scan clock 401 (which may typically run at 100 kilocycles per second). The scan counts $N_1$, $N_2$ and $N_3$ are fed to input message gates 410 to sequentially enable respective ones thereof in accordance with the particular branch to which each corresponds. This is done for the purpose of scanning the branches to determine whether any is ready to send an input message as indicated by the branch sending a REQUEST TO INPUT control signal. The manner in which this scanning is accomplished will now be described.

In order to receive signals transmitted by each branch, the buffer 15 is provided with a receiver and converter 411 (FIG. 11a) (one for each branch) which may be similar to the receiver and converter 311 of the branch controller 30 (FIG. 10b), and like the receiver and converter 311, each receiver and converter 411 produces data signal and control signal clock pulses $C_d$ and $C_c$ in response to the appearance of respective data and control signals at the output thereof. Likewise, a transmitter and converter 409 (FIG. 11b) is provided (one for each branch) for transmitting signals from the buffer 15 to each respective branch. This transmitter and converter 409 may be similar to the transmitter and converter 309 in the branch controller 30 (FIG. 10a) and may similarly provide transmitter clock pulses $C_t$ for the same purposes. Also, all of the clock pulses $C_t$, $C_c$ and $C_d$ as well as the pulses of the scan clock 401 are preferably in phase—that is, although they may have different repetition rates, when any occur together they will be in phase.

In addition to being fed to the input message gates 410, the output of each receiver and converter 411 (FIG. 11a) is also fed to a request to input detector 412 (FIG. 11a) along with the control signal clock pulses $C_c$. This is done for the purpose of producing an output pulse 412a to switch on a respective branch flip-flop 413 (FIG. 11a) in response to the receipt of a REQUEST TO INPUT control signal from its respective branch. The output of the flip-flops 413 are fed to respective ones of the input message gates 410 so that an output pulse NB is produced at the output of the input message gates 410 if the respective branch flip-flop 413 is on when the scan counter 402 (FIG. 11a) is advanced to the respective count corresponding thereto. For example, if the branch #1 flip-flop 413 has previously been turned on in response to the REQUEST TO INPUT control signal received from its respective branch, then, when the scan counter 402 advances to count $N_1$ a true pulse NB is produced in response to the leading edge of $N_1$. Thus, operation during $IX_0$ is such that the scan counter 402 scans the branches until it finds a branch flip-flop 413 on causing a true pulse NB to be produced which is applied to advance the input program counter 400 to the next count $IX_1$ (again assuming the rest count $OX_0$ of output program counter 420 in FIG. 11b is true).

2. Program count $IX_1$

The advance of the input program counter 400 to $IX_1$ in response to the true signal NB occurs sufficiently fast so that the scan counter 402 will be frozen (since $IX_0$ will no longer be true) in the particular one of the scan counts $N_1$, $N_2$ or $N_3$ which produced the true NB signal. This maintains the respective gates of the input gates 410 and the output message gates 415 enabled for receipt of an input message segment from the thus selected branch, as well as for transmitting control signals thereto.

Program count $IX_1$ is applied to a control signal generator 407 (FIG. 11b) (which may be of the same type as the control signal generator 307 in FIG. 10a) for the purpose of generating an O.K. TO INPUT SIGNAL (in response to each transmitter clock pulse $C_t$) for transmission to the selected branch via the enabled output message gates 415, the respective transmitter and converter 409 and the respective telephone lines 20a (FIG. 1). The program count $IX_1$ is also applied to turn off the selected branch flip-flop 413.

The input program counter 400 remains in program count $IX_1$ until the next following clock transmitter pulse (which is the one which causes the O.K. TO INPUT control signal to be sent) and then advances to program count $IX_2$ to await receipt of the eighteen digit input message segment (FIG. 7) from the selected branch.

3. Program count $IX_2$

During $IX_2$, the eighteen digit input message is received and loaded into a buffer register 450 (FIG. 11a). This is accomplished by feeding the data clock pulse $C_d$ accompanying each received digit (via AND gate 440 and OR gate 441) to both the "count" input of digit counter 445 and the "fill" input of the buffer register 450 (FIG. 11a). The pulses $C_d$ thus permit the digit counter 445 to count the digits as they are received, and also control the loading of each digit into the buffer register as it is received by the receiver and converter 411 of the selected branch.

Each of the eighteen digits of the input message segment received from the branch is also fed to a parity check circuit 456 (FIG. 11a) which, similarly to the parity check circuit 356 of the branch controller (FIG. 10b), checks the parity of each digit as well as the sum parity when the last digit is received, producing a PARITY O.K. output pulse when $C_d$ occurs during the last digit count $D_{18}$ if parity checks out fully, and a PARITY ERROR output pulse if it does not.

There are three possibilities that can occur during program count $IX_2$.

(a) If parity checks out so that a PARITY O.K. signal is produced, then, when the data clock pulse $C_d$ of the last digit occurs during digit count $D_{18}$, the input program counter 400 will be advanced to program count $IX_{o.k.}$ and the digit counter 445 will be returned to its initial count $D_1$.

(b) If parity does not check out so that a PARITY ERROR signal is produced, then, when $C_d$ occurs during digit count $D_{18}$, the input program counter 400 will be advanced to program count $IX_e$ and the digit counter 445 will be returned to its initial count $D_1$.

(c) If for some reason the digit counter 445 never reaches count $D_{18}$ (because, for example, communication fails between the buffer and the selected branch), then a timer 435 (FIG. 11a) (which runs during $IX_2$ until digit count $D_{18}$ is reached) will run out and produce an output pulse 435a to advance the input program counter 400 to program count $IX_e$, which resets the timer 435.

4. Program count $IX_{o.k.}$

Program count $IX_{o.k.}$ is fed to the control signal generator 407 (FIG. 11b) to cause a MESSAGE O.K. control signal to be sent to the selected branch to advise the branch that the input message segment was correctly received. $IX_{o.k.}$ is also fed to the data processor 12 (FIG. 1) to advise the processor that the buffer 15 is ready to send an input message segment thereto.

The input program counter 400 then remains in program count $IX_{o.k.}$ with its buffer register 450 (FIG. 11a) filled with the just received input message segment until a $IG_{o.k.}$ signal is received from the data processor indicating that the data processor is ready to accept the input message segment stored in the buffer register 450. This $IG_{o.k.}$ signal from the processor causes the input program count to advance to program count $IX_3$. It is to be noted that for ease of identification all signals received from the processor have a capital "G" in their designation (such as $IG_{o.k.}$).

5. Program count $IX_e$

As mentioned in connection with program count $IX_2$, the input program counter 400 is advanced to $IX_e$ in the event a parity error occurs or if the full input message segment is not received. The program count $IX_e$ is fed to the control signal generator 407 (FIG. 11b) to cause a MESSAGE ERROR control signal to be sent to the selected branch to advise the branch that the input message was not correctly received. The program count $IX_e$ is also fed to the "reset" input of time 435, and to the "clear" input of the buffer register 450 (FIG. 11a) to clear any digits which might have ben stored therein.

At the next transmitter clock pulse $C_t$ occurring after advancement of the input program counter 400 to $IX_e$, the input program counter 400 is advanced back to its rest count $IX_0$ which resets the parity check circuit 456.

It will be noted that both program counts $IX_{o.k.}$ and $IX_e$ are fed to the scan counter 402 to advance it by one count. This is done so that when scanning resumes in the rest count $IX_0$, the branch following the one just selected will be scanned first.

6. Program count $IX_3$

As indicated in connection with program count $IX_{o.k.}$, the input program counter 400 is advanced to $IX_3$ from $IX_{o.k.}$ in response to a processor signal $IG_{o.k.}$ indicating that the processor is ready to accept the input message segment stored in the buffer register 450 during $IX_2$.

Program count $IX_3$ enables gates 270 (FIG. 11a) to cause the selected branch number ($N_1$, $N_2$ or $N_3$) to be fed to the processor. Then, at the first processor clock pulse $C_G$ occurring after advancement to $IX_3$, the input program counter 400 is switched to program count $IX_g$.

7. Program count $IX_g$

During program count $IX_g$, processor clock pulses $C_G$ obtained from the processor are fed through AND gate 451 and OR gate 452 FIG. 11a) to the "empty" input of the buffer register 450 to control the feeding of the eighteen digit input message segment stored therein to the data processor. The output of OR gate 452 is also fed to the digit counter 445 (FIG. 11a) (which is returned to its initial count $D_1$ during $IX_2$) to cause it to count the digits as they are sent.

The processor clock pulse $C_G$ occurring when the digit counter 445 reaches $D_{18}$ causes the last digit of the eighteen digit input message segment to be sent to the processor, the digit counter 445 to be returned to its initial count $D_1$, and the input program counter 400 to be advanced back to its rest count $IX_0$. Return to the rest count $IX_0$ resets the parity check circuit 456 and returns the digit counter 445 to its initial count $D_1$ if it is not already there.

(B) *Buffer output operations.*—(Program counts $OX_0$, $OX_1$, $OX_2$, $OX_g$, $OX_3$, $OX_4$, $OX_{o.k.}$, and $OX_e$ of output program counter 420 in FIG. 11b.)

1. Program count $OX_0$

During $OX_0$ (which is the rest count for the output program counter 420) the buffer output circuitry remains quiescent and the true state of $OX_0$ permits the buffer to handle input message segments. The output program counter 420 remains in program count $OX_0$ until the processor sends a signal $OG_{o.k.}$ to the buffer indicating that it wishes to send an output message segment thereto. The processor signal $OG_{o.k.}$ advances the output program counter 420 to program count $OX_1$ at the next occurring clock pulse $C_G$.

2. Program count $OX_1$

If the input program counter 400 (FIG. 11a) is not in its rest program count $IX_0$ when the output program counter 420 (FIG. 11b) is advanced to $OX_1$, it will remain in $OX_1$ until the input program counter 400 returns to $IX_0$. Then, at the next processor clock pulse $C_G$ occurring after both $IX_0$ and $OX_1$ are true, the output program counter 420 is caused to advance to program count $OX_2$.

3. Program count $OX_2$

Program count $OX_2$ is fed to the data processor 12 (FIG. 1) to advise the processor that the buffer is ready to receive an output message segment. The output program counter 420 will remain in program count $OX_2$ until a begin pulse $OG_s$ is received from the processor which advances the output program counter 420 to program count $OX_g$.

At the same time that the processor sends the begin pulse $OG_s$ to the buffer, the processor also sends branch select data via a branch selector 380 (FIG. 11b) to set the scan counter 402 (FIG. 11a) to the particular one of the counts $N_1$, $N_2$ or $N_3$ which corresponds to the particular branch for which the output message segment is intended.

4. Program count $OX_g$

During $OX_g$, processor clock pulses $C_G$ are fed via AND gate 439 and OR gate 441 (FIG. 11a) to the "fill" input of the buffer register 450 (FIG. 11a) to control the feeding of the eighteen digit input message segment (which includes all parity information), digit by digit, from the processor to the buffer register 450 for storage therein. The output of OR gate 452 is also fed to the digit counter 445 (FIG. 11a) to advance the counter 445 from its initial count $D_1$ and thereby keep count of the digits of the output message segment as they arrive from the processor.

The processor clock pulse $C_G$ occurring when the digit counter reaches $D_{18}$ causes the last digit of the output message segment to be stored in the buffer register 450, the digit counter 445 to be returned to its initial count $D_1$, and the output program counter 420 to be advanced to program count $OX_3$.

5. Program count $OX_3$

During program count $OX_3$, the eighteen digit input message segment which is stored in the buffer register 450 during program count $OX_g$ is fed out to the selected branch via gates 475 and 415 to the respective transmitter and converter 409 (FIG. 11b) corresponding to the selected branch. An appropriate delay is provided between digits to give the selected window machine solenoids (FIGS. 5 and 9b) a sufficient time to set before the next digit is sent. The manner in which this is accomplished during $OX_3$, will now be described.

The buffer register 450 is emptied digit by digit for transmission of the output message segment to the selected branch in response to transmitter clock pulses $C_t$ applied to the "empty" input thereof via AND gate 449 (FIG. 11a) and OR gate 452. However, AND gate 449 will be enabled to permit pulses $C_t$ to pass therethrough only when output signal Q from one-shot 492 is true as a result of one-shot 492 being off. Normally one-shot 492 is off, but is turned on for a predetermined time (making Q false) whenever one of the digits $D_3$ to $D_{11}$ and $D_{14}$ to $D_{16}$, having a value other than zero is fed out from the buffer register 450 (FIG. 11a) during $OX_3$ for transmission to the selected branch. A non-zero digit is detected by a non-zero detector 491 which, in response to a non-zero digit, produces an output pulse 491a which is applied to one-shot 492 through AND gate 497 if the non-zero digit is $D_3$–$D_{11}$ or $D_{14}$–$D_{16}$.

It will be understood that each of the digits $D_3$ to $D_{11}$ and $D_{14}$ to $D_{16}$, if not zero, will require a setting of a respective keyboard solenoid. The one-shot 492, when turned on as just described, serves to provide, by its output signal Q (which is false when one-shot 492 is on), an appropriate transmission delay suitable to permit sufficient time for the setting of keyboard solenoids. Other digits are sent with the normal waiting time provided by the repetition rate of the transmitter clock pulses $C_t$. Although digits $D_{13}$ and $D_{17}$ also involve keyboard solenoids, no special delay is provided since they are applied to storage 240 (FIG. 9b) rather than directly to their respective solenoids.

The output of AND gate 449 (FIG. 11a) is also applied, via OR gate 452, to the digit counter 445 to permit the digits to be counted as they are fed out, digit by digit, from the buffer register 450 (FIG. 11a) and fed via gates 475 and 415 (FIG. 11b) to the transmitter and converter 409 of the selected branch. When transmitter clock pulse $C_t$ occurs during the last digit count $D_{18}$, the last digit of the eighteen digit output message segment is fed out of the buffer register 450 for transmission to the selected branch, the digit counter 445 is returned to its initial count $D_1$, and the output program counter 420 is advanced to program count $OX_4$.

6. Program count $OX_4$

During program count $OX_4$, the buffer 15 awaits receipt of a signal from the selected branch as to whether or not the eighteen digit input message segment was correctly received thereby. There are three possibilities.

(a) If a MESSAGE O.K. signal is received by the buffer via the respective receiver and converter 411 (FIG. 11a), then a MESSAGE O.K. output line of a control character decoder 410a will become true to advance the output program counter 420 to program count $OX_{o.k.}$.

(b) If a MESSAGE ERROR signal is received from the selected branch, then the MESSAGE ERROR output line of the control character decoder 410 will become true to advance the output program counter 420 to program count $OX_e$.

(c) If for any reason no message is received from the selected branch during $OX_4$, then a timer 493 (FIG. 11b) which is energized during $OX_4$ will run out and produce an output pulse 493a to also advance the output program counter 420 to $OX_e$ which resets the timer 493.

7. Program count $OX_{o.k.}$

Program count $OX_{o.k.}$ is fed to the processor to indicate that the output message segment was correctly received by the selected branch. At the next following transmitter clock pulse $C_t$, the output program counter 420 is advanced back to its rest count $OP_0$.

8. Program count $OX_e$

Program count $OX_e$ is fed to the processor to indicate that the output message segment was not properly received. The processor, therefore, retains the output message segment and will not try to send it again for a predetermined time.

It is to be noted that both $OX_e$ and $OX_{o.k.}$ are fed to the "count" input of the scan counter. This is done so that when scanning resumes, the branch following the one just handled will be scanned first.

CONCLUSION

While the foregoing disclosure has been primarily concerned with a particular exemplary embodiment, it is to be understood that the invention is susceptible of many modifications in construction and arrangement as well as a variety of related uses. For example, in the typical mechanization just described, provision could be made for a predetermined number of retries in the event an error occurs, rather than immediately dispensing with the message segment presently being handled. Also, many buffers 15 could be provided operating simultaneously instead of just a single buffer. Furthermore, the system may readily incorporate other types of on-line operations such as mortgage transactions, Christmas club, and the like.

The above examples of modifications are, of course, only illustrative of many others that could be provided. The present invention, therefore, is not to be considered as limited to the specific disclosure provided herein, but is to be considered as including all modifications and variations coming within the scope of the invention as defined in the appended claims.

What is claimed is:

1. In an on-line banking system, a central accounting location and a plurality of branches cooperating therewith, said central accounting location having a data processor, a random access unit providing a high capacity rapid access store for said processor, and at least one buffer provided to control the flow of information between said data processor and a predetermined plurality of said branches, each of said branches including a plurality of multi-row keyboard window machines, an associated unit for each window machine, and a branch controller provided to control the flow of information between said window machines via their respective associated units and said central accounting location, each branch controller including means for sequentially scanning said window machines until one is found which is ready to have a keyboard entry read out therefrom in response to which the branch controller signals the central accounting location that it is ready to transmit a message segment thereto, a message segment corresponding to a single window machine keyboard entry, said buffer including means for sequentially scanning said predetermined plurality of branches until one is found which is ready to transmit a message segment in response to which the buffer sends a signal to the selected branch which causes the branch controller to read out the keyboard entry from the selected window machine and transmit it without intermediate storage to the buffer at the central accounting location, said buffer including a buffer register for storing the received message segment until the data processor is ready to accept the message segment therefrom.

2. The invention in accordance with claim 1, wherein said buffer includes means for receiving a message segment from said processor and for storing it in said buffer register, said buffer also including means for sequentially emptying said buffer register and for transmitting the message segment stored therein to a selected branch, and wherein each branch controller includes means for receiving a message segment transmitted from said buffer and for applying the received output message to a selected one of said window machines via its respective associated unit.

3. In an on-line system, a plurality of first locations, a plurality of multi-row keyboard input-output devices provided at each first location, means operative to permit manual entry into each keyboard, means operative to permit automatic entry into each keyboard in essentially the same manner as manual entry in response to remote electrical signals, a first sequentially operating access means at each first location for providing sequential access to its respective input-output devices, a data processor provided at a second location remote from said first location, a second sequentially operating access means at said second location for providing sequential access between said second location and said first locations, means for reading out data manually entered into the keyboard of a selected input-output device and for transmitting the data directly to said second location via its respective first access means and to said data processor via said second access means without any intermediate storage being provided at said first location, and means for transmitting data from said data processor to a selected input-output device via said second access means and the respective first access means so as to provide electrical signals for entering data from the processor into the keyboard thereof.

4. In an on-line system, a plurality of first locations, a plurality of multi-row keyboard input-output devices provided at each first location, means operative to permit each keyboard to be set either manually or remotely in response to electrical signals applied thereto, a first sequentially operating access means at each first location for controlling the flow of data to and from said input-output devices in the form of message segments handled in a serial manner, a message segment corresponding to a keyboard entry of a single input-output device, a data processor provided at a second location remote from said first location, a second sequentially operating access means at said second location for controlling the flow of data between said data processor and a selected first location in the form of message segments handled in a serial manner, and at least one buffer means at said second location cooperating with said data processor and said second sequentially operating access means for receiving or transmitting a single message segment at a time between said data processor and said first location.

5. In an on-line system, a central location and a plurality of remote input-output devices cooperating therewith, said central location having a data processor, a high capacity random access unit cooperating with said processor, receiving means for receiving an input message from an input-output device for feeding to said processor, transmitting means for serially transmitting a multi-digit output message from said processor to one of said remote input-output devices, each input-output device including components responsive to respective digits of an output message with significantly different response times, said transmitting means including means responsive to the digits of the output message for providing an automatically changeable time interval between the transmission of the digits of said output message in dependence upon the response times of the components of the input-output device to which the digits of the output message are sent.

6. The invention in accordance with claim 5 wherein said time interval is controlled in accordance with both the magnitude and order of said digits.

7. The invention in accordance with claim 5 wherein a first time interval is provided after the transmission of predetermined ones of said digits if the digit has a magnitude other than zero, and a second interval is provided for all other digits.

8. In an on-line system, a central location, a plurality of remote locations, and communication means provided between each remote location and said central location, each remote location including a plurality of input-output devices and remote-location control means connected between said input-output devices and its respective communication means, said remote-location control means being constructed and arranged to sequentially scan its respective input-output devices to detect when an input-output device is ready to input a message to said central location in response to which said remote-location control means locks thereon and transmits a ready to input control signal to said central location via its respective communication means, said central location including a data processor and central-location control means connected between said processor and said communication means, said central-location control means being constructed and arranged to sequentially scan said communication means to detect the transmission of a ready to input control signal from a remote location in response to which said central-location control means locks thereon and transmits via the respective communication means an o.k. to input control signal to the remote location onto which said central-location control means is locked, said remote-location control means being further constructed and arranged to respond to said o.k. to input control signal to cause input data from the input-output device onto which it is locked to be fed to said central location via the respective communication means, said central-location control means being further constructed and arranged to receive input data from the remote location onto which it is locked and to feed said input data to said data processor.

9. The invention in accordance with claim 8, wherein said central-location control means includes detecting means for detecting an error condition occurring during communication with a selected remote location, and means responsive to said detecting means for breaking off communication with the remote location for which an error is detected and for causing the sequencing to proceed to the next remote location.

10. In an on-line system, a central location, a plurality of remote input-output devices cooperating therewith, each input-output device having a keyboard for manually entering data into said device, and arithmetic processing means selectively responsive to data entered into said keyboard, means for transmitting first and second entries in the keyboard of an input-output device to said central location while applying only one of the entries to said arithmetic processing means, means at said central location for processing the first and second entries and for transmitting back to the input-output device the particular one of said first and second entries which was not applied to the arithmetic processing means, each input-output device including means responsive to a returned entry to automatically apply the returned entry to said arithmetic means for processing with the previously applied entry, each input-output device also including means for indicating the results of the processing of the two entries by said arithmetic processing means.

11. The invention in accordance with claim 10 wherein said means responsive to a returned entry is coupled to said keyboard to cause automatic operation thereof in response to the returned entry.

12. In an on-line system, a central location, a plurality of remote input-output devices cooperating therewith, each input-output device having a keyboard, an add-subtract totalizer, print-out means, and input record means for receiving an input record for printing by said print-out means, means for transmitting particular first and second entries in the keyboard of an input-output device to said central location while causing only one of said entries to be fed to said add-subtract totalizer and neither of said entries to affect said print-out means, means at said central location for processing the first and second entries and for transmitting back to the input-output device the particular one of said first and second entries which was not fed to said add-subtract totalizer, each input-output device including means responsive to a returned entry to automatically feed the returned entry to said add-subtract totalizer and to initiate operation thereof with respect to said first and second entries and to cause said print-out means to print the results thereof on said input record means.

13. In an on-line system, a central location, a plurality of input-output devices cooperating therewith, each input-output device having output indication means, keyboard means for manually entering first and second entries into said device, arithmetic means responsive to a particular one of said entries into the keyboard means and unresponsive to the other, means for transmitting said first and second entries to said central location, means at said central location for transmitting back to the input-output device the entry to which the arithmetic means was not responsive when entered into said keyboard means, each input-output device including means automatically responsive to a returned entry to cause said arithmetic means to respond thereto and to process the first and second entries and apply the results thereof to said output indication means, and alternatively operable manual means provided on said device for manually controlling the operation of said device so that said arithmetic means will respond to both of said entries entered in said keyboard means and feed the results of processing thereby to said output indication means.

References Cited by the Examiner

UNITED STATES PATENTS

| | | | |
|---|---|---|---|
| 2,706,215 | 4/1955 | Van Duuren | 178—2 |
| 3,029,414 | 4/1962 | Schrimpf | 340—172.5 |
| 3,061,192 | 10/1962 | Terzian | 235—157 |
| 3,158,318 | 11/1964 | Bason | 235—146 |
| 3,181,124 | 4/1965 | Hammel | 340—172.5 |
| 3,200,380 | 8/1965 | MacDonald et al. | 340—172.5 |
| 3,202,972 | 8/1965 | Stafford et al. | 340—172.5 |

ROBERT C. BAILEY, *Primary Examiner.*

I. S. KAVRUKOV, *Assistant Examiner.*

UNITED STATES PATENT OFFICE
CERTIFICATE OF CORRECTION

Patent No. 3,308,439                               March 7, 1967

Robert M. Tink et al.

It is hereby certified that error appears in the above numbered patent requiring correction and that the said Letters Patent should read as corrected below.

Column 8, line 19, for "marking" read -- making --; column 22, line 16, for "sloenoids" read -- solenoids --; line 57, for "county" read -- count --; column 23, line 50, for "MECHANISM" read -- MECHANIZATION --.

Signed and sealed this 9th day of January 1968.

(SEAL)
Attest:

Edward M. Fletcher, Jr.                            EDWARD J. BRENNER

Attesting Officer                                        Commissioner of Patents